US010799903B2

(12) United States Patent
Davis et al.

(10) Patent No.: US 10,799,903 B2
(45) Date of Patent: Oct. 13, 2020

(54) ADJUSTABLE ROW UNIT AND VEHICLE WITH ADJUSTABLE ROW UNIT

(71) Applicant: Deere & Company, Moline, IL (US)

(72) Inventors: Travis J. Davis, Polk City, IA (US); Joshua T. Lawson, Woodbury, MN (US); Curtis A. Maeder, Johnston, IA (US); Jesse D. Haecker, LeClaire, IA (US); Richard J. Connell, Slater, IA (US); Shayne C. Rich, Grimes, IA (US); Anthony E. Eggers, Urbandale, IA (US); Curtis D. Carlson, Ankeny, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 15/693,348

(22) Filed: Aug. 31, 2017

(65) Prior Publication Data

US 2018/0243771 A1 Aug. 30, 2018

Related U.S. Application Data

(60) Provisional application No. 62/465,060, filed on Feb. 28, 2017, provisional application No. 62/544,310, filed on Aug. 11, 2017.

(51) Int. Cl.
*B05B 12/12* (2006.01)
*A01B 63/00* (2006.01)
(Continued)

(52) U.S. Cl.
CPC ............ *B05B 12/12* (2013.01); *A01B 63/004* (2013.01); *A01B 63/008* (2013.01); *A01M 7/006* (2013.01);
(Continued)

(58) Field of Classification Search
CPC ..... B05B 12/12; B05B 12/004; B05B 12/124; B05B 12/008; A01M 7/0057;
(Continued)

(56) References Cited

U.S. PATENT DOCUMENTS 1,943,655 A * 1/1934 Cummings ......... A01M 7/0089
239/146
2,806,572 A 9/1957 Gammie
(Continued)

FOREIGN PATENT DOCUMENTS

CA 2902922 A1 3/2016
DE 4140254 A1 6/1993
(Continued)

OTHER PUBLICATIONS

Chamen, Tim. "David Dowler—A History." Aug. 19, 2007 [online], [retrieved on Nov. 29, 2018]. Retrieved from the Internet <URL:http://www.controlledtrafficfarming.com/downloads/David%20Dowler%20-%20a%20history.pdf>.

(Continued)

*Primary Examiner* — Tuongminh N Pham
(74) *Attorney, Agent, or Firm* — Harness, Dickey & Pierce, P.L.C.

(57) ABSTRACT

A first leg extends upward from the left frame and a second leg extends upward from the right frame to connect the legs to the beam. One or more satellite navigation receivers are associated with beam to determine a position and an attitude of the beam. One or more row units are suspended from the beam, each row unit having a first nozzle and a second nozzle, wherein the first nozzle and the second nozzle are associated with an adjustable reference position in one or more dimensions with respect to the beam.

19 Claims, 17 Drawing Sheets

(51) Int. Cl.

| | |
|---|---|
| ***G05D 1/02*** | (2020.01) |
| ***B05B 12/00*** | (2018.01) |
| ***A01M 7/00*** | (2006.01) |
| *G01S 19/13* | (2010.01) |
| *F16K 31/02* | (2006.01) |
| *A01M 21/04* | (2006.01) |
| *A01C 15/00* | (2006.01) |
| *A01C 21/00* | (2006.01) |
| *A01C 7/10* | (2006.01) |
| *A01C 7/20* | (2006.01) |
| *A01C 23/04* | (2006.01) |
| *A01C 23/00* | (2006.01) |
| *A01B 69/04* | (2006.01) |

(52) U.S. Cl.

CPC ........ *A01M 7/0014* (2013.01); *A01M 7/0082* (2013.01); *B05B 12/004* (2013.01); *G05D 1/0278* (2013.01); *A01B 69/008* (2013.01); *A01C 7/102* (2013.01); *A01C 7/208* (2013.01); *A01C 15/006* (2013.01); *A01C 21/005* (2013.01); *A01C 23/007* (2013.01); *A01C 23/047* (2013.01); *A01M 7/0057* (2013.01); *A01M 7/0089* (2013.01); *A01M 21/043* (2013.01); *F16K 31/02* (2013.01); *G01S 19/13* (2013.01); *G05D 2201/0201* (2013.01)

(58) Field of Classification Search

CPC ............. A01M 7/0089; A01M 21/043; G05D 1/0278; A01C 7/102; A01C 7/208; A01C 15/006; A01C 21/005; A01C 23/007; A01C 23/047; A01C 63/008; F16K 31/02; G01S 19/13; A01B 79/005; A01B 63/004; A01B 69/008

USPC ...................................... 212/324; 239/71, 73

See application file for complete search history.

(56) References Cited

U.S. PATENT DOCUMENTS

| | | | | |
|---|---|---|---|---|
| 3,825,087 | A | 7/1974 | Wilson | |
| 4,397,421 | A | 8/1983 | Schram | |
| 5,092,422 | A | 3/1992 | Hood et al. | |
| 5,246,164 | A | 9/1993 | McCann et al. | |
| 5,266,115 | A | 11/1993 | Taccon et al. | |
| 5,614,024 | A * | 3/1997 | Ishida | B05B 12/084 118/697 |
| 5,628,262 | A | 5/1997 | Nelson | |
| 5,704,546 | A * | 1/1998 | Henderson | A01M 7/0089 239/1 |
| 5,842,307 | A | 12/1998 | May | |
| 5,927,603 | A | 7/1999 | McNabb | |
| 6,018,907 | A | 2/2000 | Roehrick | |
| 6,036,103 | A * | 3/2000 | Benest | B05B 7/0416 239/159 |
| 6,454,294 | B1 | 9/2002 | Bittner et al. | |
| 6,491,234 | B2 | 12/2002 | Beggs | |
| 6,553,299 | B1 | 4/2003 | Keller et al. | |
| 6,807,973 | B2 | 10/2004 | Fratello et al. | |
| 9,265,187 | B2 | 2/2016 | Cavender-Bares et al. | |
| 2002/0066810 | A1 * | 6/2002 | Prandi | A01G 25/092 239/728 |
| 2002/0162575 | A1 * | 11/2002 | Fratello | B60S 3/04 134/18 |
| 2007/0188605 | A1 | 8/2007 | Anderson et al. | |
| 2008/0046130 | A1 | 2/2008 | Faivre et al. | |
| 2011/0132993 | A1 | 6/2011 | Wiseman et al. | |
| 2011/0172811 | A1 * | 7/2011 | Chinkiwsky | A01B 79/005 700/231 |
| 2011/0266365 | A1 * | 11/2011 | Hrnicek | A01B 79/005 239/164 |
| 2013/0087640 | A1 | 4/2013 | Pfrenger | |
| 2013/0248478 | A1 | 9/2013 | Wheeler et al. | |
| 2015/0081120 | A1 * | 3/2015 | Pfrenger | A01G 25/092 700/284 |
| 2015/0142250 | A1 | 5/2015 | Cavender-Bares et al. | |
| 2015/0230390 | A1 | 8/2015 | Green | |
| 2015/0245565 | A1 | 9/2015 | Pilgrim et al. | |
| 2015/0351309 | A1 | 12/2015 | Gaus | |
| 2017/0020087 | A1 | 1/2017 | Younis et al. | |
| 2018/0242517 | A1 | 8/2018 | Davis et al. | |
| 2018/0243772 | A1 | 8/2018 | Davis et al. | |
| 2018/0243773 | A1 | 8/2018 | Davis et al. | |
| 2018/0243774 | A1 | 8/2018 | Davis et al. | |

FOREIGN PATENT DOCUMENTS

| | | | |
|---|---|---|---|
| EP | 2839739 | A1 | 2/2015 |
| EP | 2974582 | A1 | 1/2016 |
| FR | 898599 | A | 4/1945 |
| WO | 2012094116 | A1 | 7/2012 |
| WO | 2015055680 | A1 | 4/2015 |
| WO | 2016191825 | A1 | 12/2016 |

OTHER PUBLICATIONS

Schafer, Winfried. "Gantry technology in organic crop production." MTT Agrifood Research Finland and NJF, Aug. 14, 2003. In Proceedings of the NJF's 22nd Congress Nordic Agriculture in Global Perspective, pp. 212 [online], [retrieved on Apr. 12, 2018]. Retrieved from the Internet <URL: 2003.http://orgprints.org/881/1/GANTRYTECHNOLOGY_IN_ORGANIC_CROP_PRODUCTION.pdf>.

Search Report issued in related application No. EP18158764.3, dated Jul. 9, 2018 (10 pages).

Search Report issued in related application No. EP18158760.1, dated Jul. 9, 2018 (8 pages).

Search Report issued in related application No. EP18158767.6, dated Jul. 9, 2018 (10 pages).

Search Report issued in related application No. EP18158769.2, dated Jul. 9, 2018 (9 pages).

Search Report issued in counterpart application No. EP18158770.0, dated Jul. 25, 2018 (9 pages).

* cited by examiner

X Axis (78)
Y Axis (80)
Z Axis (82)
11
10
12
13
14
16
18
22
24
26
27
28
30
32
34
36
38
40
42
44
46
48
50
52
54
56
58
60
62
63
64
65
66
68
70
72
74
76
118
124
136
148
150

11
10
20
22
24
26
27
28
30
36
38
42
44
62
63
65
66
68
70
72
76
86
88
90
100
118
124
136
148
150
176
12
13
14
16
17
18
21

807
802
802
802
802
804
66
66
66
22
24
803
124
18
10
18
18
11

802
802
802
802
800
801
803
66
66
66
22
124
10
18
18
18
24
11

38
44
10
136

150
148
18
982
176
66
76
983
65
981
148
18
982
176
63
66
76
983
176
981
148
36
42

ADJUSTABLE ROW UNIT AND VEHICLE WITH ADJUSTABLE ROW UNIT

RELATED APPLICATIONS

This document (including the drawings) claims priority and the benefit of the filing date based on U.S. provisional application No. 62/465,060, filed Feb. 28, 2017, and on U.S. provisional application No. 62/544,310, filed Aug. 11, 2017, under 35 U.S.C. § 119 (e), where the above provisional applications are hereby incorporated by reference herein.

FIELD OF DISCLOSURE

This disclosure relates to an adjustable row unit and an agricultural vehicle with an adjustable row unit.

BACKGROUND

Some prior art sprayers use sectional nozzle control or individual nozzle control to spray or treat crop with crop inputs, such as pesticide, fungicide, fertilizer, herbicide, chemicals or other treatments. However, the prior art sprayers may be unable to target accurately plants with appropriate levels of crop inputs if the plants deviate from linear rows or even row spacing because of plant growth or inaccurate planting of seed. For example, deviation of plants from ideal row spacing can be associated with human error in manual driving of planters or machine error in automated guidance systems, such as position drift in satellite navigation receivers without real-time kinematic reference base stations or without real-time precise correction signals. Sometimes, actual crop yields are reduced from potential crop yields because of the sprayer's inaccuracies in the application of crop inputs or problematic adherence to prescriptions (e.g., zone-based prescriptions of corresponding the rate of amount of crop inputs) from experienced farmers, agronomists or horticultural experts. Further, the grower or operator of the sprayer may tend to compensate for inaccuracies in treating plants by over-application of crop inputs or chemicals that can reduce profit margins for growers or result in unnecessary environmental impact. Thus, there is a need for a sprayer with adjustable row units to provide appropriate or targeted level of crop inputs to plants, even if the plants rows deviate from ideal row spacing.

SUMMARY

In accordance with one embodiment, an agricultural machine, sprayer, or planter comprises a left frame and a right frame. A left wheel is rotatable with respect to the left frame and a right wheel is rotatable with respect to the right frame. A first leg extends upward from the left frame and a second leg extends upward from the right frame to connect the legs to the beam. One or more satellite navigation receivers are associated with beam to determine a position and an attitude (e.g., angular orientation) of the beam. In accordance with another aspect of the disclosure, one or more row units are suspended from the beam, each row unit having a first nozzle and a second nozzle, wherein the first nozzle and the second nozzle are associated with an adjustable reference position in one or more dimensions with respect to the beam. For example, the position (e.g., three dimensional position) of a nozzle or nozzles on each row unit can be adjusted simultaneously and dynamically in multiple dimensions to maintain: a target (e.g., uniform) spacing between the nozzle and ground, between the nozzle and a guidance line or path plan, or between the nozzle and a plant or row of plants (e.g., as the sprayer moves in the field in real time.

BRIEF DESCRIPTION OF THE DRAWINGS

Like reference numbers in any set of drawings indicates like elements or features.

DETAILED DESCRIPTION

Figure 1:
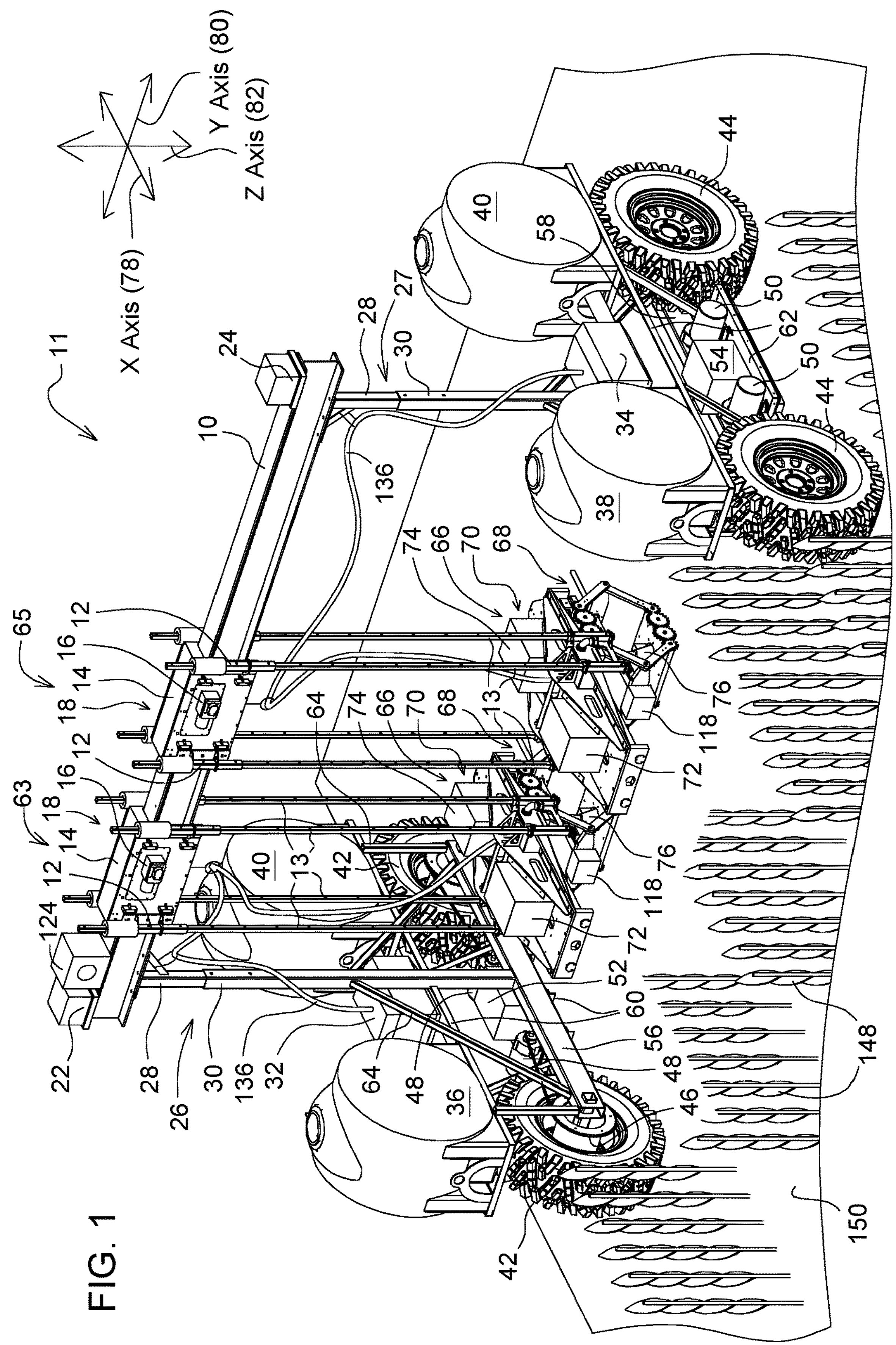
FIG. 1 is a perspective view of one embodiment of the sprayer vehicle or agricultural vehicle.

In accordance with one embodiment, FIG. 1 illustrates an agricultural machine or sprayer vehicle 11 that comprises a left frame (26, 60, 64, 60, collectively) and a right frame (27, 58, 62, collectively) that are connected by a beam 10. Although the agricultural machine illustrated in FIG. 1 is configured as a sprayer, the sprayer vehicle 11 or agricultural machine can be configured as a planter or a different sprayer by replacing the lower carriage 66 of the row unit with alternate lower carriages later described in this document in FIG. 12 through FIG. 15, for example. At least one left wheel 42 is rotatable with respect to the left frame and at least one right wheel 44 is rotatable with respect to the right frame. A first leg 26 extends upward from the left frame and a second leg 27 extends upward from the right frame to connect to the beam 10. As illustrated, the first leg 26 has an upper member 28 that is connected (e.g., coaxially or telescopically) with a lower member 30; the second leg 27 has an upper member 28 that is connected (e.g., coaxially or telescopically) with a lower member 30, although the first leg 26 and the second leg 28 may comprise continuous members in other embodiments. One or more location-determining receivers (22, 24), such as satellite navigation receivers, are associated with beam 10 to determine a position and an attitude (e.g., angular orientation) of the beam 10. As illustrated in the drawings and set forth in this document, the Y axis 80 is coextensive with the lateral direction of the beam 10, and the X axis 78 is substantially perpendicular to the beam 10. The X axis 78 runs in the longitudinal direction, which can be aligned with the direction of forward travel of the sprayer vehicle 11. The Z axis 82 runs in the vertical direction.

In accordance with another aspect of the disclosure, one or more row units (63, 65) are suspended from the beam 10, such that the position (e.g., three dimensional position) of nozzle 76 or nozzles on each row unit can be adjusted simultaneously and dynamically in multiple dimensions to maintain a target (e.g., uniform) spacing between the nozzle 76 ground 150, or between the nozzle 76 and a guidance path or path plan of the sprayer vehicle 11, or between the nozzle 76 and a plant or row of plants 148 (e.g., as the sprayer moves in the field in real time).

Each row unit (63 or 65) has a corresponding nozzle 76 or a set of nozzles 76 with an adjustable position in one or more dimensions with respect to the beam 10, along with adjustable or fixed roll, tilt and yaw angles of the nozzle 76 or set of nozzles 76. For example, for each row unit (63 or 65), the nozzle 76 can be adjusted in three-dimensions, such as height (Z axis 82), lateral (Y axis 80), and longitudinal (X axis 78) with respect to specific plants 148, stems, stalks, trunks, vines, roots, foliage, leaves, leaf canopies, plant rows, or target zones based on image data or other sensor data, while the sprayer is guided along a path plan in accordance with one or more location-determining receivers (22, 24), such as satellite navigation receivers equipped with wireless communication devices to receive correction data.

Location-Determining Receivers

In one configuration, each location-determining receiver (22 or 24) may comprise any satellite navigation receiver, such as a Global Positioning System (GPS) receiver, a Global Navigation Satellite System (GLONASS) receiver, or another satellite navigation receiver, where each location-determining receiver (22, 24) may use differential phase correction or other correction signals associated with one or more reference satellite receivers in known geographic locations.

In one embodiment, sprayer may use only one location-determining receiver (22 or 24), such as a first satellite navigation receiver (e.g., multi-channel satellite navigation receiver), with two switched antennas 901 or time-multiplexed antennas that are spatially separated along the beam 10 by a known baseline distance, such as a first antenna at or near a first end of the beam 10 and a second antenna at or near a second end of the beam 10. For example, the first end and the second end of the beam can be at or near opposite ends of the beam.

The first location-determining receiver 22 can determine: (1) a first position of a first antenna based on first carrier phase measurements of four or more satellite signals at a first time when the antenna switch is in a first state with an active first antenna and disconnected second antenna, (2) a second position of a second antenna 901 based on second phase measurements four or more satellite signals at a second time when the antenna switch is in a second state with an active second antenna and disconnected from the first antenna, wherein the first time and second time are within a maximum time interval, and (3) a vector difference between the first position and the second position to estimate a reference point position and an attitude of the beam 10.

In another embodiment, the sprayer may use both the first location-determining receiver 22 and the second location-determining receiver 24 such as a first satellite navigation receiver and a second satellite navigation receiver that are separated along the beam 10 by a known baseline difference. The first location-determining receiver 22 is located on a first end of the beam 10, wherein the second location-determining receiver 24 determines a first position (e.g., three-dimensional coordinates of the receiver's antenna). The second location-determining receiver 24 is on a second end of the beam 10 opposite the first end. The second location-determining receiver 24 determines a second position simultaneously with the determination of the second position (e.g. three-dimensional coordinates of the receiver's antenna).

An electronic data processor (903 in FIG. 7) or a location-determining receiver (22, 24) is adapted to estimate the reference point associated with the beam 10 of the machine and an angular orientation or attitude of the beam 10 relative to the reference point. For example, a data processor 903 estimates a reference point on or projected directly below the machine on the ground 150 and an angular orientation or attitude of the beam 10 relative to the reference point. In some configurations, the angular orientation is determined by a vector difference between the first position and the second position observed during a time interval or the same time period. The attitude refers to the tilt angle, the roll angle or yaw angle of the beam 10, sprayer 11 or agricultural machine.

Path Planning and Vehicle Guidance

As illustrated in FIG. 1, the sprayer vehicle 11 has two left wheels 42 and two right wheels 44. The propulsion system of the sprayer vehicle or agricultural vehicle supports steering of the sprayer vehicle 11 in accordance with one or more of the following: (1) the position data and associated attitude of the beam 10 or vehicle 11 from one or more location-determining receivers (22, 24) or the electronic data processor 903, (2) the image data from the imaging device 124 on the location of the beam 10 or sprayer vehicle 11 with respect to plant rows, guidance line, a center of a row, or plants 148, and (3) path plan, guidance line, mission plan, or any of the combination thereof, established by a master data processing system 902, or its path planning module 910, or its mission planning module 909, respectively. The mission planning module 909 may allow a grower to program or direct the sprayer vehicle 11 to spray, treat or fertilize crops or plants 148 in a field in accordance with a guidance plan or path plan. The path planning module 910 can use a survey, field boundaries and keep-out zones, or prior maps to generate a path plan for the sprayer vehicle 11 to cover an entire area of a field with spray with minimal overlap of crop inputs.

In one embodiment, the left wheel 42(*s*) and the right wheel 44(*s*) have a differential rate of rotation with respect to each other to adjust the yaw of the sprayer vehicle 11, or turn or steer the sprayer vehicle 11 to the left or to the right, in accordance with a path plan, or deviation from a path plan to avoid obstacles, hazards, people or animals.

In one configuration, a first drive motor 48 is associated with the left wheel 42 and a second drive motor 50 is associated with the right wheel 44. For example, the first drive motor 48 and the second drive motor 50 may drive the left wheel 42 and the right wheel 44 respectively, by a chain 46, belt or other mechanism.

In an alternate embodiment, the first drive motor 48 and the second drive motor 50 may be integral to the respective hubs of the wheels.

The first drive motor 48 and the second drive motor 50 may represent alternating current motors, permanent magnet motors, induction motors, switched reluctance motors, direct current motors, electric motors, or other electrical machines. In one illustrative example, the first motor controller 52 provides a first alternating current signal to control the torque, direction or speed of rotation of the first drive motor 48; a second motor controller 54 provides a second alternating current signal to control the rotation of the second drive motor 50.

Figure 6:
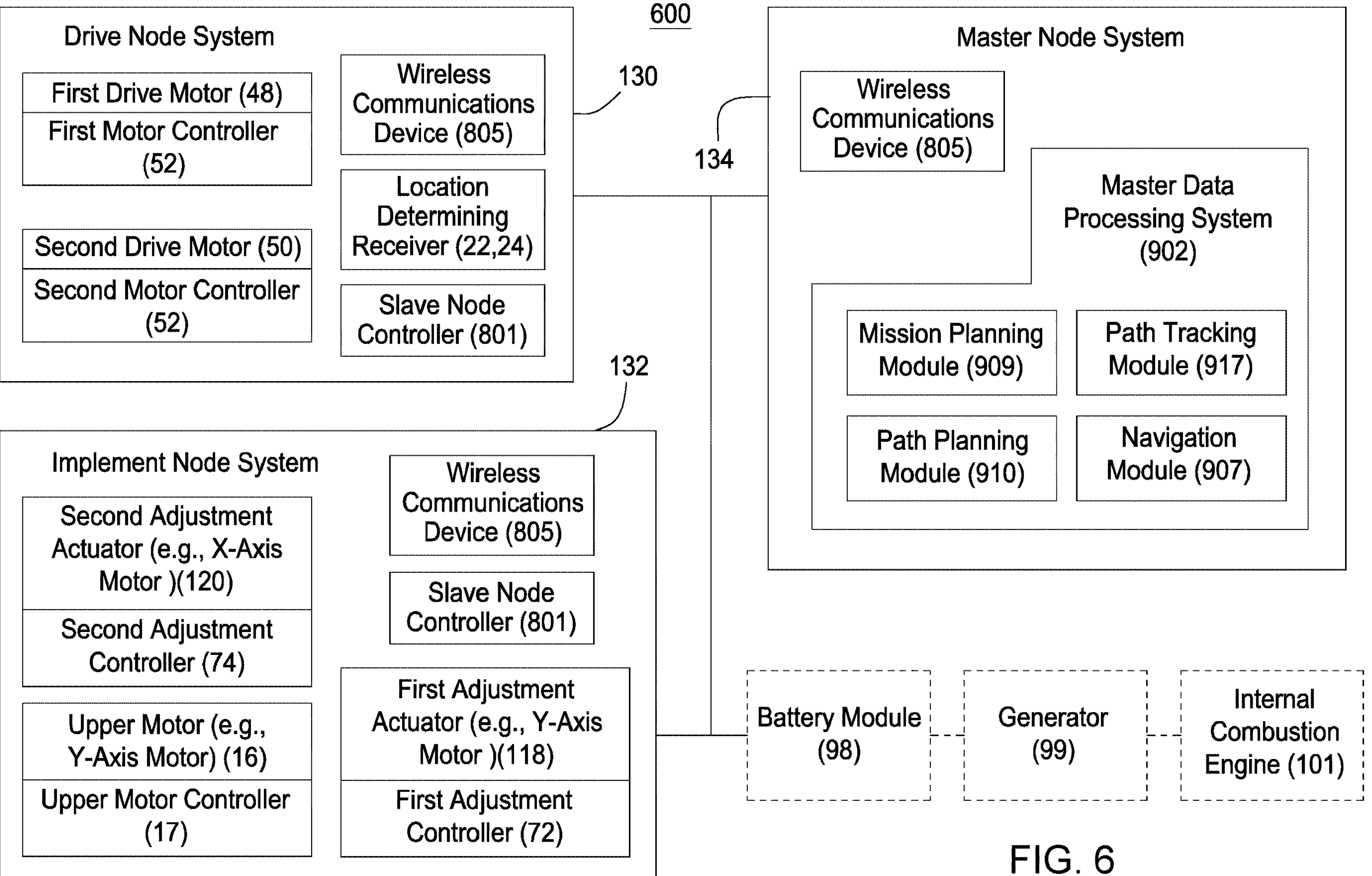
FIG. 6 is a block diagram of one embodiment of the electrical or electronic system for the sprayer that uses wireless communications.
Figure 7:
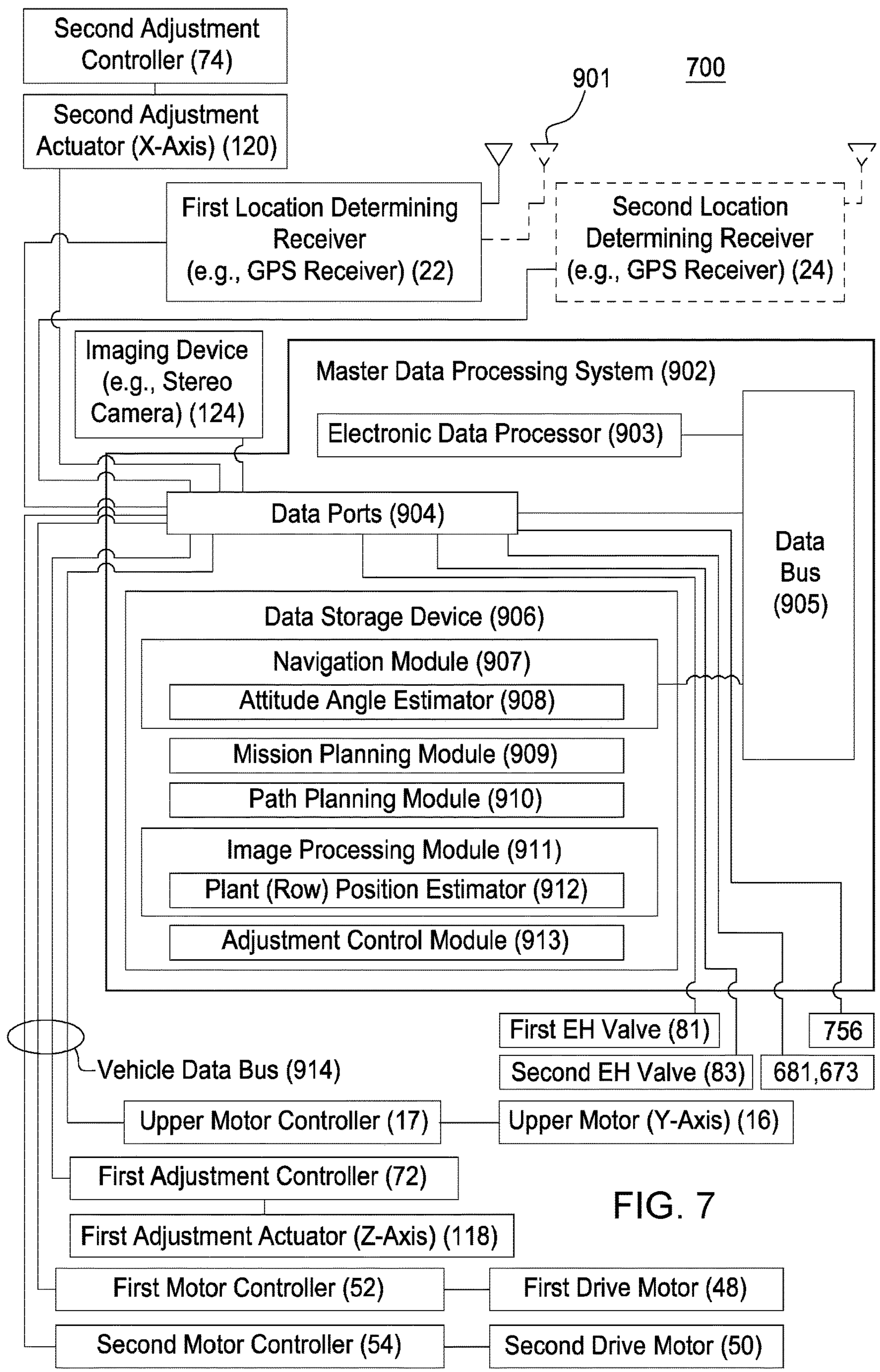
FIG. 7 is a block diagram of another embodiment of the electrical or electronic system for the sprayer.

Referring to FIG. 6 and FIG. 7, the slave node controller 801, a drive node system 130 or data processor can provide command data messages to the first motor controller 52 and the second motor controller 54 for straight path segments, such as AB guidance lines or parallel paths thereto, or curved path segments, such as contour path segments or parallel paths thereto. The slave node controller 801, drive node system 130 or data processor 903 can apply various techniques separately or cumulatively to steer or direct the sprayer vehicle 11 or agricultural machine. Under a first technique, the slave node controller 801, drive node system 130 or data processor can effectuate a substantially identical rate of rotation between the first drive motor 48 and the second drive motor 50 to maintain a straight linear path of the sprayer 11 or agricultural machine in accordance with a path plan such that the beam 10 forms a substantially right angle of the angular orientation with respect to one or more plant rows of a field.

Under a second technique, slave node controller 801, a drive node system 130 or a data processor 903 provides command data messages to the first motor controller 52 and the second motor controller 54 to effectuate a substantially differential rate of rotation between the first drive motor 48 and the second drive motor 50 to maintain a curved path segment of the sprayer vehicle 11 or agricultural machine in accordance with a path plan such that the beam 10 forms a substantially right angle of the angular orientation with respect to an intercept of the beam 10 with the curved path segment.

In one embodiment, a battery module 98 is associated with the left frame, the right frame or both for providing electrical energy to the first motor controller 52 and to the second motor controller 54. In turn, the first motor controller 52 and the second motor controller 54 provide control signals, such as pulse-width modulated signals or other alternating current signals, to control the torque, speed, or direction of the rotor of the first drive motor 48 and the second drive motor 50 to propel and steer the vehicle 11 along a path plan, guidance line or guidance path. As illustrated in FIG. 1, each first motor controller 52 may control one or more first drive motors 48 and each second motor controller 54 may control one or more second drive motors 50.

In one illustrative embodiment, the battery module 98 can be recharged at recharging station or at a suitable source of alternating current voltage or direct current voltage.

In an alternate embodiment, the sprayer vehicle 11 or agricultural vehicle includes a generator 99 for providing electrical energy to the battery module 98. For example, the generator 99 may comprise the combination of an alternator that outputs alternating current and a rectifier that converts the alternating current to direct current. An internal combustion engine 101 provides rotational energy to the generator 99. A generator 99 rotor shaft can be driven by the crankshaft of output of an internal combination engine 101.

Row Unit

Figure 2:
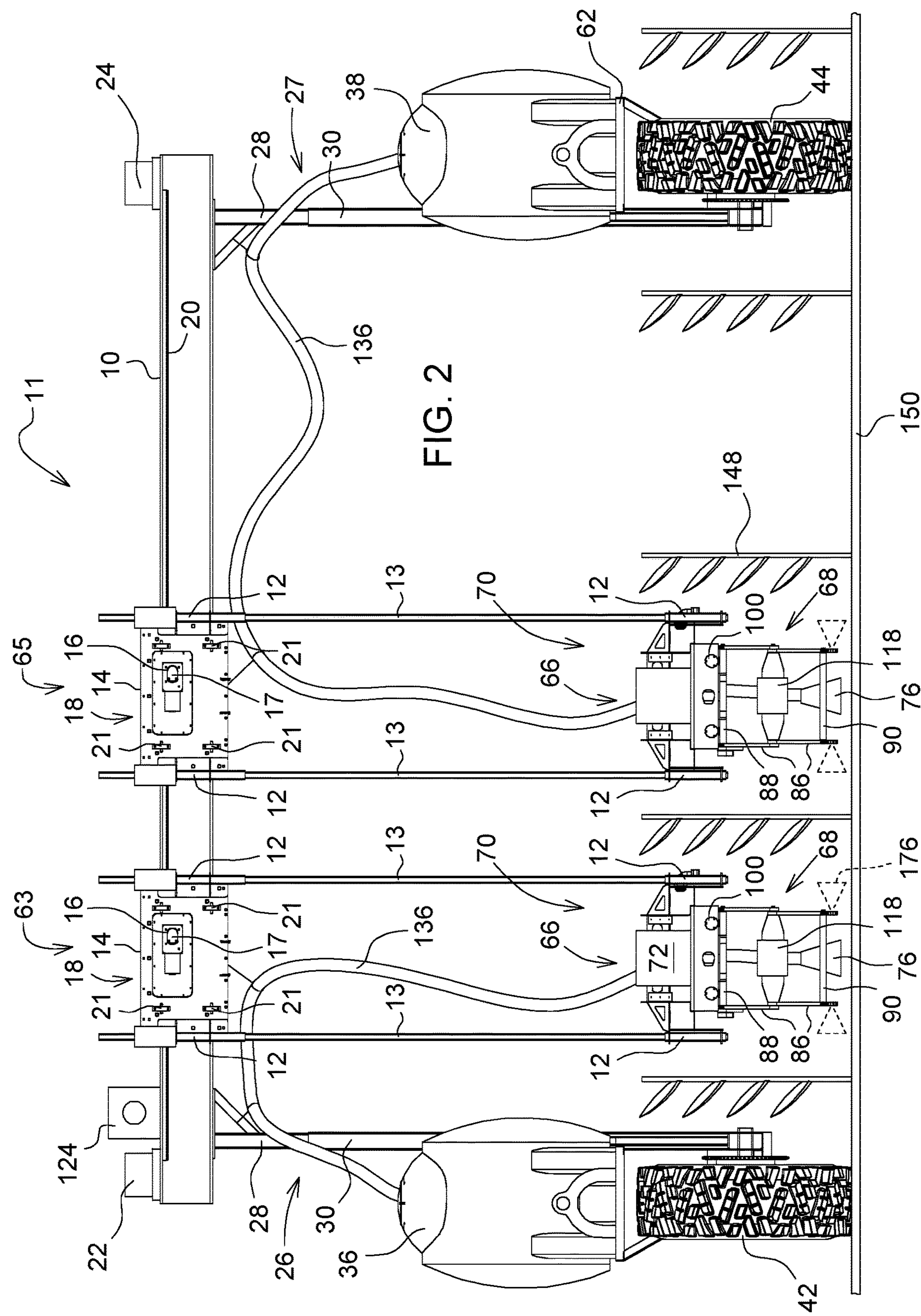
FIG. 2 is front elevation view of the sprayer in accordance with FIG. 1.

In one embodiment, shown in FIG. 2, the sprayer comprises a group of row units (63, 65) that are suspended from the beam 10, where each row unit can service one or more plant rows from a set of one or more nozzles 76. In one example, a first row unit 63 that is suspended from the beam 10 with at set of first nozzles 76 and second row unit 65 is suspended from the beam 10 with a set of second nozzles 76. The first row unit 63 and the second row unit 65 are spaced apart from each other. A data processor 903, implement node system 132, or slave node controller 801, alone or together, can independently adjust a first three-dimensional position of the first row unit 63 from a second three-dimensional position of the second row unit 65, provided the row units are adequately separated to protect against collision with each other. In one embodiment, the data processor 903 or master data processing system 902 has master control or supervisory control of the data processing within the implement node system 132 or its slave node controller 801, where the master data processing system 902 can assign tasks, functions, calculations or execution to the implement node system 132 in accordance with parallel processing or sequential processing software instructions, such as sharing data for processing in addressable memory of the data storage device 906.

Each row unit (63, 65) and its associated nozzles (76, 176) have a distinct and independent three-dimensional position or row unit coordinates that can be observed and controlled separated by the data processing system 902 and the associated controllers (e.g., slave node controllers 801, upper motor controller 17, first adjustment controller 72, second adjustment controller 74) under its supervisory control. The location determining receivers (22, 24) can provide global position and attitude of the sprayer vehicle 11 (e.g., or its beam 10), while each row unit (63, 65) simultaneously provides estimated height (e.g., Z-axis position), longitudinal (e.g., X-axis position), and lateral position (e.g., Y-axis position), which may be referred to as row unit coordinates, for the lower carriage 66, the first position adjuster 68 or its associated nozzles (76, 176). For example, the upper motor 16 may be associated with an encoder for estimating a rotor position of the upper motor 16, alone or in combination with the upper motor controller 17 to derive the row unit coordinates; the first adjustment actuator 118 may be associated with an encoder for estimating a first actuator position to derive the row unit coordinates; the second adjustment actuator 120 may be associate with an encoder for estimating a second actuator position to derive the row unit coordinates. In one embodiment, during one or more time intervals, the data processing system 902 determines, by vector addition, linear algebra or otherwise, the global or real world coordinates of the row unit, its lower carriage 66, or its nozzles (76, 176) based on observed position and attitude of the sprayer vehicle 11, along with the observed row unit coordinates of a row units. For example, in the data processing system 902 the respective Y-position of each row unit (or its upper carriage 18) along the beam 10 intercepts a corresponding vector representative of vehicle orientation based on the associated vehicular position and vehicular attitude to establish an estimate real-world Y-position of the nozzle (76, 176) on the particular row unit, which can be corrected for any material lateral slope of the ground given the height of the antenna of the location-determining receiver (22, 24) above ground.

However, in alternate embodiments, the upper motor controller 17 may be adapted to estimate the rotor position of the upper motor 16 without any encoder; the first adjustment controller 72 may be adapted to estimate the first actuator position of the first adjustment actuator 118; the second adjustment controller 74 may be adapted to estimate the second actuator position, where the implement node system or the master data processing system 902 can estimate the row unit coordinates associated with the nozzles (76, 176) of one or more row units (63, 65).

Imaging Device

In one embodiment, an imaging device 124 is mounted on the beam 10 or one of the legs (26, 27) to collect image data to determine a first lateral distance between the first row unit 63 (or its first nozzle 76) and a first row of plants 148 and a second lateral distance between the second row unit 65 (or its second nozzle 76) and a second row of plants 148. The imaging device 124 may have a primary field of view that includes one or more row units (63, 65) and respective rows of crops; further the imaging device 124 may have a primary or secondary field of view that extends forward in the direct of travel of the sprayer vehicle 11. The row spacing of the plants in the particular field may be known from as-planted data, a seed planting map, row spacing of the planter or planting implement that was used to plant a field, or a zone or portion of field. A planter or its computer system may provide the source for such as-planted data or a seed planting map in a suitable format for uploading or inputting to the master data processing system via a data port or a user interface, such as keyboard, a pointing device and display. In some circumstances, the row unit (63, 65) or lower carriage 66 is generally laterally centered between two adjacent rows of plants 148 such that nozzles 76 can be simultaneously directed outward to treat the two adjacent rows of plants 148 at once during a single pass of the vehicle 11. In other circumstances, the row unit (63, 65) or a or lower carriage 66 is positioned at a target lateral distance such as: (a) the first lateral distance between the lower carriage 66 and the plants 148 of a row, (2) a first lateral distance (e.g., a lateral offset) or no lateral distance between a center point or guidance line between two adjacent plant rows, or (3) the first lateral distance between one or more nozzles 76 of the lower carriage 66 unit and the plants 148 of the plant row. The lateral difference setting of the nozzle 76 may depend upon the height of the nozzle 76 in some configurations, and could be stored as a data structure (e.g., a look-up table) of height settings and corresponding lateral settings or lateral offsets in the data storage device 906 for execution by the drive node system 130, the implement node system 132, and the master node system 134.

In one configuration, an imaging device 124 is mounted on the beam 10 or one of the legs 86 to collect image data to estimate on or more of the following: (1) a first ground 150 clearance between the first row unit 63 and the ground 150 and a second ground 150 clearance between the second row unit and the ground 150; and (2) a first height of a first nozzle 76 of the first row unit 63 and a second height of a second nozzle 76 of a second row unit.

In another configuration, an imaging device 124 is mounted on the beam 10 or one of the legs (26, 27) for determining a first longitudinal offset between a first nozzle 76 of the first row unit 63 and a respective plant center (e.g., foliage center of mass or volume with respect to plant pixels or voxels) or plant stem, and a second longitudinal offset between a second nozzle 76 of the second row unit and a respective plant center or plant stem.

In one embodiment, the sprayer vehicle 11 or agricultural machine includes a first tank 36 supported on or by the left frame or first shelf system 60 of one or more shelves or stacked shelves. As illustrated, the first leg 26 terminates at a first horizontal support 56 that provides support for mounting the axel or hub of one or more left wheels 42, or that provides support for the first shelf system 60. One or more supports 64 may provide bracing and structural rigidity between the first leg 26 and the first horizontal support 56, for the shelf systems (60, 62) or otherwise. The first tank 36 facilitates storing a fluid or crop input for distribution onto a field, plants 148, or soil. A first pump 32 is arranged for pumping a fluid stored in the first tank 36 to a set of first nozzles 76 via tubing 136 for targeted distribution to a zone of a field, a particular row in a field or to particular plants 148 or portions of plants 148 in the field because the three-dimensional position of a nozzle 76 or set of nozzles 76 associated with each row unit can be controlled. Although the nozzle 76 is pointed downward in FIG. 1 for the first row unit 63 or leftmost row unit, it is understood that the nozzle or an optional set of nozzles 176 (shown in FIG. 2 in dashed lines) may face outward or in any other orientation, or roll, tilt and yaw angles that are suitable for directing the crop input or fluid to its intended target, such as a plant, a row of plants, the foliage of plants, the base, stem, vine, trunk or stalk of the plants, or the roots of plants.

A second tank 38 is supported on or by the right frame or second shelf system 62 of one or more shelves or stacked shelves. As illustrated, the second leg 27 terminates at a second horizontal support 58 that provides support for mounting the axel or hub of one or more right wheels 44, or that provides support for the second shelf system 62. The second tank 38 facilitates storing a fluid or crop input for distribution onto a field, plants 148, or soil. A second pump 34 is arranged for pumping a fluid stored in the second tank 38 to a set of second nozzles 76 via tubing 136 for targeted distribution to a zone of a field, a particular row in a field or to particular plants 148 or portions of plants 148 in the field because the three-dimensional position of a nozzle 76 or set of nozzles 76 associated with each row unit (63, 65) can be controlled. Although the nozzle 76 is pointed downward in FIG. 1 for the second row unit 65 or rightmost row unit, it is understood that the nozzle or an optional set of nozzles 176 (shown in FIG. 2 in dashed lines) may face outward or in any other orientation, or roll, tilt and yaw angles that are suitable for directing the crop input or fluid to its intended target, such as a plant, a row of plants, the foliage of plants, the base, stem, vine, trunk or stalk of the plants, or the roots of plants.

In one embodiment, one or more auxiliary tanks 40 can service additional corresponding row units 40 or can provide extra capacity for the first row unit 63 and second row unit 65.

Row Unit

In FIG. 1 and FIG. 2, each row unit (63, 65) has an upper carriage 18 and a lower carriage 66 that is coupled to or ganged with the lower carriage 66. An upper carriage 18 is movable or slidable with respect to a generally horizontal beam 10 of a sprayer vehicle 11. A plurality of vertical supports 13 suspends the lower carriage 66 from the upper carriage 18, or supports 64 the lower carriage 66. Each vertical support 13 has an upper end connected to the upper carriage 18 and a lower end opposite the upper end. A lower carriage 66 is connected to the lower end of the vertical supports 13, such that the upper carriage 18 determines a lateral position of the lower carriage 66 with respect to the beam 10.

In any embodiments, multiple row units (63, 65) may be used that comprise multiple upper carriages 18 and respective lower carriages 66. Mutually exclusive lateral zones of the carriages can be separated by a protection zone where multiple upper carriages 18 and lower carriages 66 are associated with the sprayer vehicle 11 to avoid interference between any two adjacent lower carriages 66 or upper carriages 18.

Upper Carriage

Figure 3:
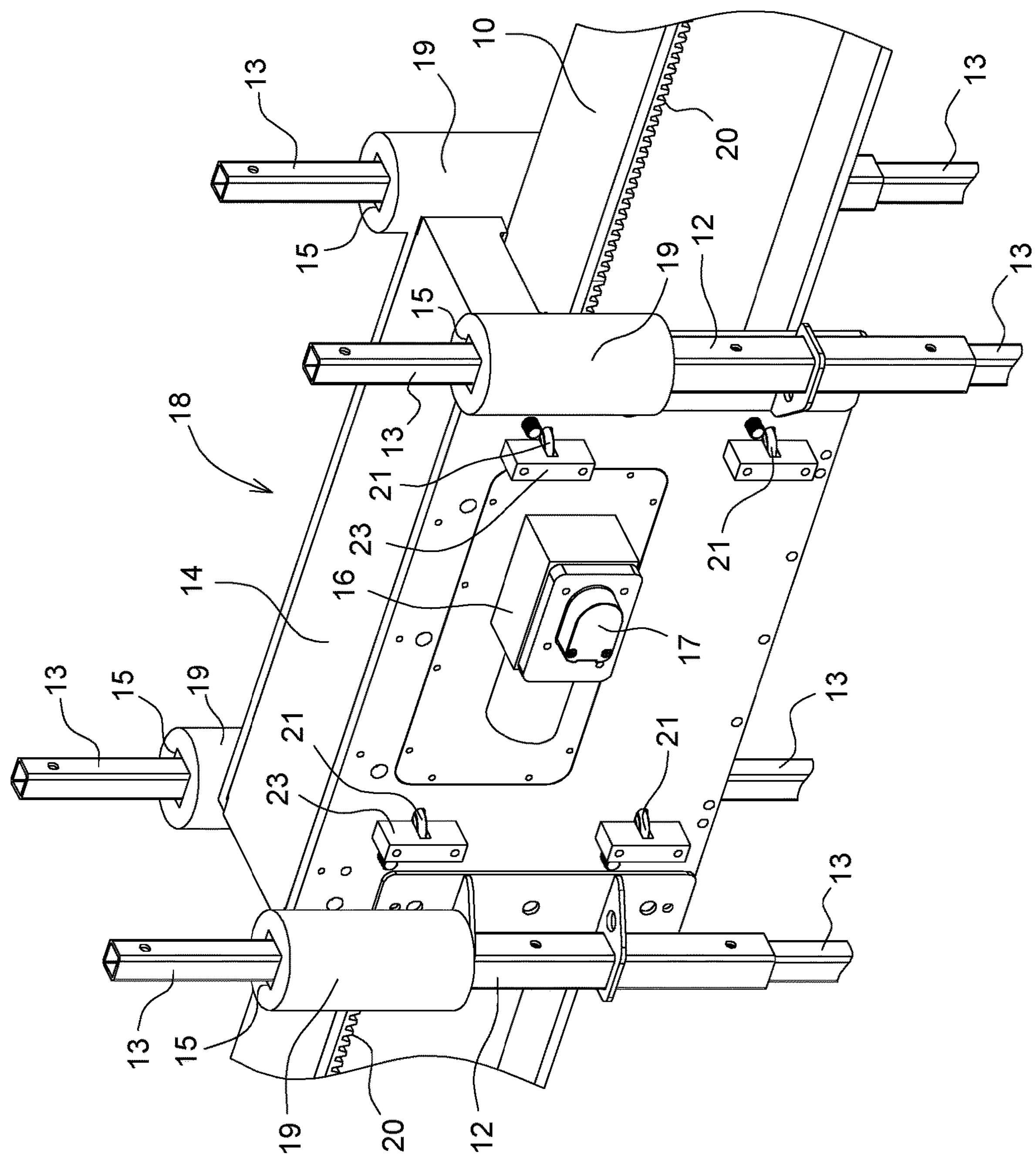
FIG. 3 is an enlarged perspective view of a rectangular region of an upper carriage of a row unit in FIG. 1.

As best illustrated in FIG. 3, the upper carriage 18 has a frame 14, where at least at least two rollers 21 are rotatable about a rotational axis with respect to the frame 14. The rollers 21 face one or more of the following beam 10 surfaces: a top surface of the beam 10, a front side of the beam 10, and a rear side of the beam 10. The front side of the beam 10 is opposite the rear side of the beam 10. In one configuration if side rollers 21 are used, the front-side roller and the rear-side roller can be clamped or compressed against the beam 10 to prevent movement along the X axis 78 and to support movement of the upper carriage 18 along the Y axis 80. In one embodiment, the rollers 21 are biased by springs or other biasing members against the beam 10.

In one embodiment, at least one surface of the beam 10 has a rack gear 20 or rack teeth. For example, as illustrated in FIG. 1, the rack gear 20 is on an interior horizontal bottom surface, although the rack gear 20 could be formed or mounted on other surfaces of the beam 10. A pinon gear (not shown) or other gear of an upper motor 16 engages the rack gear 20. An upper motor 16 drives the pinon gear to move (or to laterally slide) the upper carriage 18 in a lateral direction along the beam 10, or generally along the Y axis 80. An upper motor controller 17 provides control signals to the upper motor 16 to move the upper carriage 18 along the beam 10 in response to data messages or commands from a central data processor 903, a slave node controller 801, or otherwise.

As illustrated, the upper carriage 18 has brackets 12 for securing a plurality of generally vertical supports 13 in a fixed vertical position. In one configuration, the brackets 12 may comprise clamps, such as U-clamps, whereas in other configurations the brackets 12 may use bolts or screws to compress a sleeve or retainer (not shown) around a portion of the vertical supports 13.

In an alternate embodiment, a set of openings 15 in the frame 14, or pylons 19 thereof, may complement or replace the bracket 12.

The vertical supports 13 may comprise tubes, rods, beams, telescopic tubes or other support members. Although four vertical supports 13 are illustrated in FIG. 1, in alternate embodiments other numbers of vertical supports 13 may be used, such as three vertical supports or as few as one support with a cross section sufficient to provide stability (e.g., in three dimensions).

In an alternate embodiment, the vertical supports 13 comprise movable or adjustable threaded rods or supports with rack gear teeth that support vertical adjustment of the lower carriage 66 member with respect to the upper carriage 18 member or the beam 10; where such vertical adjustment could be used alone, or cumulatively with the first position adjuster 68. In one alternate embodiment, a linear actuator is positioned on the upper carriage 18 to support movement of each threaded rod or alternate vertical support to raise or lower the lower carriage 66 or implement carriage.

In another alternate embodiment, a vertical adjustment motor with a corresponding pinion gear engages each vertical support with a corresponding rack gear to raise or lower the lower carriage 66 or implement carriage. For example, one vertical linear actuator or vertical motor is used per alternate vertical support to move the support; hence, raise and lower carriage 66 in unison. The vertical linear actuator or vertical motor can be used to adjust the vertical height of a plurality of row units to conform to a target height above the ground 150, where the vertical distance between the upper carriage 18 and the lower carriage 66 may differ for each pair of upper carriage 18 and lower carriage 66 as the vehicle travels through a field with uneven, tilted or laterally sloped ground.

As previously indicated, the upper carriage 18 comprises a frame 14 and a set of rollers 21 that are rotatable with respect to the frame 14 and that ride against a surface of the beam 10. An upper motor 16 is mounted to the frame 14 and the upper motor 16 has a shaft that terminates in a pinion gear. A rack gear 20 is attached to or formed on the beam 10, where the pinon gear engages to the rack gear 20 to support simultaneous lateral adjustment of the upper carriage 18 and the lower carriage 66. The upper motor controller 17 provides a control signal to control the upper motor 16 to position a nozzle 76 or set of nozzles 76 on the lower carriage 66 in accordance with a target lateral separation to a row of plants 148, a path plan or a guidance line, where the control signal responsive to an image data from an imaging device 124 or sensor data from another sensor, such as an laser scanning device, a laser range finder, an ultrasonic position sensor, a light detection and ranging (LIDAR) device or otherwise.

The lower carriage 66 supports movement of a three-dimensional position (e.g., targeted x, y and z position coordinates) of a nozzle 76 on the lower carriage 66 by a first position adjuster 68 for adjusting height (z-axis position) of the nozzle 76 and a second position adjuster 70 for adjusting a longitudinal position (x-axis position) of the nozzle 76 based on one or more of the following: (1) image data of the imaging device 124, (2) processed stereo image data derived (e.g., three dimensional representations of pixels or voxels of plant or plant rows) from the image data by the image processing module 911, (3) heading or yaw data of the sprayer vehicle 11 from the location-determining receiver (22, 24), and (4) ground speed, velocity and/or acceleration of the sprayer vehicle 11. In one example, the height can be adjusted to maintain a minimum height clearance with respect to the ground 150 and to maintain a relative height to a peak plant height, central foliage height, or peak leaf canopy height based on image data. In another example, the lower carriage 66 supports movement of a three-dimensional position of a nozzle 76 on the lower carriage 66 by the second position adjuster 70 for adjusting a longitudinal position of the nozzle 76 to reduce or minimize a longitudinal offset between the nozzle 76 and plant stem or central plant portion. For example, the adjustment of the longitudinal position of the nozzle or nozzles (76, 176) of a row unit may consider the ground speed, velocity and acceleration and yaw angle of the sprayer vehicle 11 from one or more location-determining receivers (22, 24) to determine or estimate a longitudinal adjustment of the second position adjuster 70 for alignment or registration with a target zone of the field or a target zone of plants. The adjustments of three-dimensional position can be made and updated for each time interval.

First Position Adjuster of Lower Carriage

Figure 4:
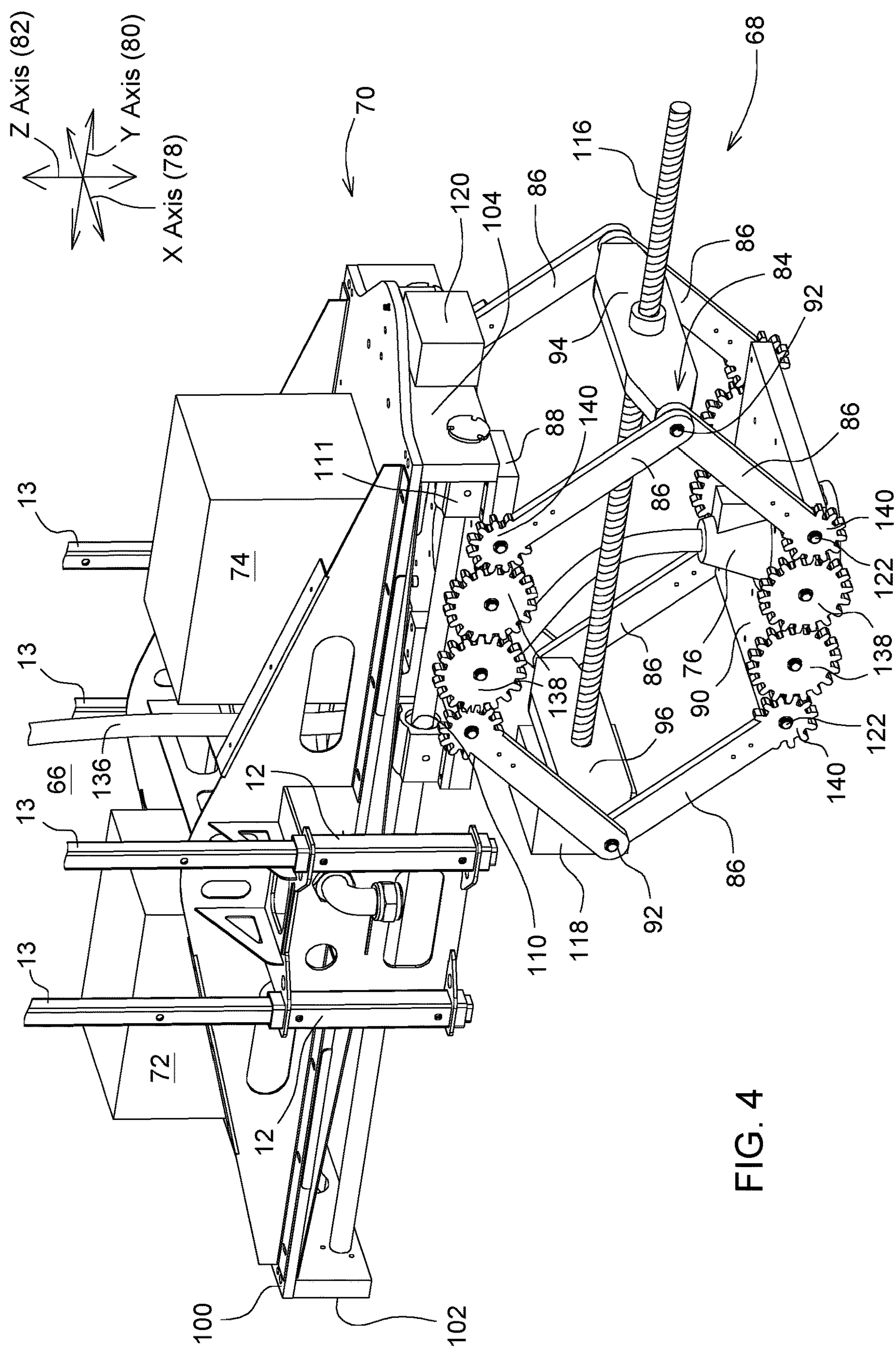
FIG. 4 is an enlarged perspective view a lower carriage of a row unit consistent with FIG. 1.

FIG. 4 illustrates a perspective view of the lower carriage 66. In one embodiment, the lower carriage 66 comprises a first position adjuster 68 for adjusting height of a nozzle 76 associated with the row unit (63, 65). For example, the first position adjuster 68 comprises a lower platform 90 and an upper platform 88 spaced apart from the upper platform 88. A group of legs 86 with pivot points (92, 122) is arranged to movably connect the lower platform 90 to the upper platform 88. The pivot points (92, 122) may comprise rivets, shafts, or bolts and nuts, swaged members, the like. A first support member 94 is associated with central pivot points 92 of the legs 86. A second support member 96 is associated with central pivot points 92 of the legs 86. The second support member 96 is located opposite from the first support member 94. A threaded rod 116 engages a threaded bore 117 in the first support member 94 and the threaded rod 116 extends toward the second support member 96 or first adjustment actuator 118 that is attached to the second support member 96. A first adjustment actuator 118 is arranged for turning the threaded rod 116 to change the height of the lower platform 90 with respect to the upper platform 88; hence, adjust precisely the height of a nozzle 76 located on the lower platform 90.

In one configuration, one end of each of the legs 86 terminates in gear teeth 140 and further comprises idler gears 138 mounted on sides of the upper platform 88 and lower platform 90 for engaging the gear teeth 140. The gear teeth 140 and idler gears 138 prevent twisting of the legs 86 or misalignment between the lower platform 90 and the upper platform 88 in which planar surfaces associated with the lower platform 90 and the upper platform 88 are no longer or not substantially parallel. The gear teeth 140 or idler 140 gears provide some constraint of motion between upper platform 88 and the lower platform 90 to remain substantially parallel or properly aligned through any height adjustment. In sum, the first position adjuster 68 comprises a first scissors linkage 84 that holds a precise target vertical separation between the upper platform 88 and the lower platform 90 and the vertical separation is adjustable precisely and quickly in real time by operation of the first adjustment actuator 118 that turns dynamically a threaded rod 116 or screw, even as the sprayer vehicle 11 traverses a path plan in the field.

A first adjustment controller 72 provides a control signal to the corresponding first adjustment actuator 118. The first adjustment controller 72 may be located on the first position adjuster 68 or the upper platform 88, for instance. However, in other configurations the first adjustment controller 72 may be integral with or housed within a common housing of the first position adjuster 68.

The first adjustment controller 72 can instruct the first adjustment actuator 118 to move the first scissors linkage 84 from a contracted position along the Z axis 82 to an expanded position along the Z axis 82, or vice versa, where the difference between the fully contracted position and the fully expanded position defines the maximum range of travel for the first position adjuster 68. The first scissors linkage 84 can maintain its adjustment or setting in the presence of considerable loads or force in the Z axis 82 direction.

If the implement carriage is used for a sprayer, a nozzle 76 or a set of nozzles 176 may be mounted on the lower platform 90 as illustrated in FIG. 2 to support adjustment of the vertical height of the nozzle 76 along the Z axis 82, whereas the lateral position is adjusted by the upper carriage 18.

Second Position Adjuster of the Lower Carriage

Figure 5:
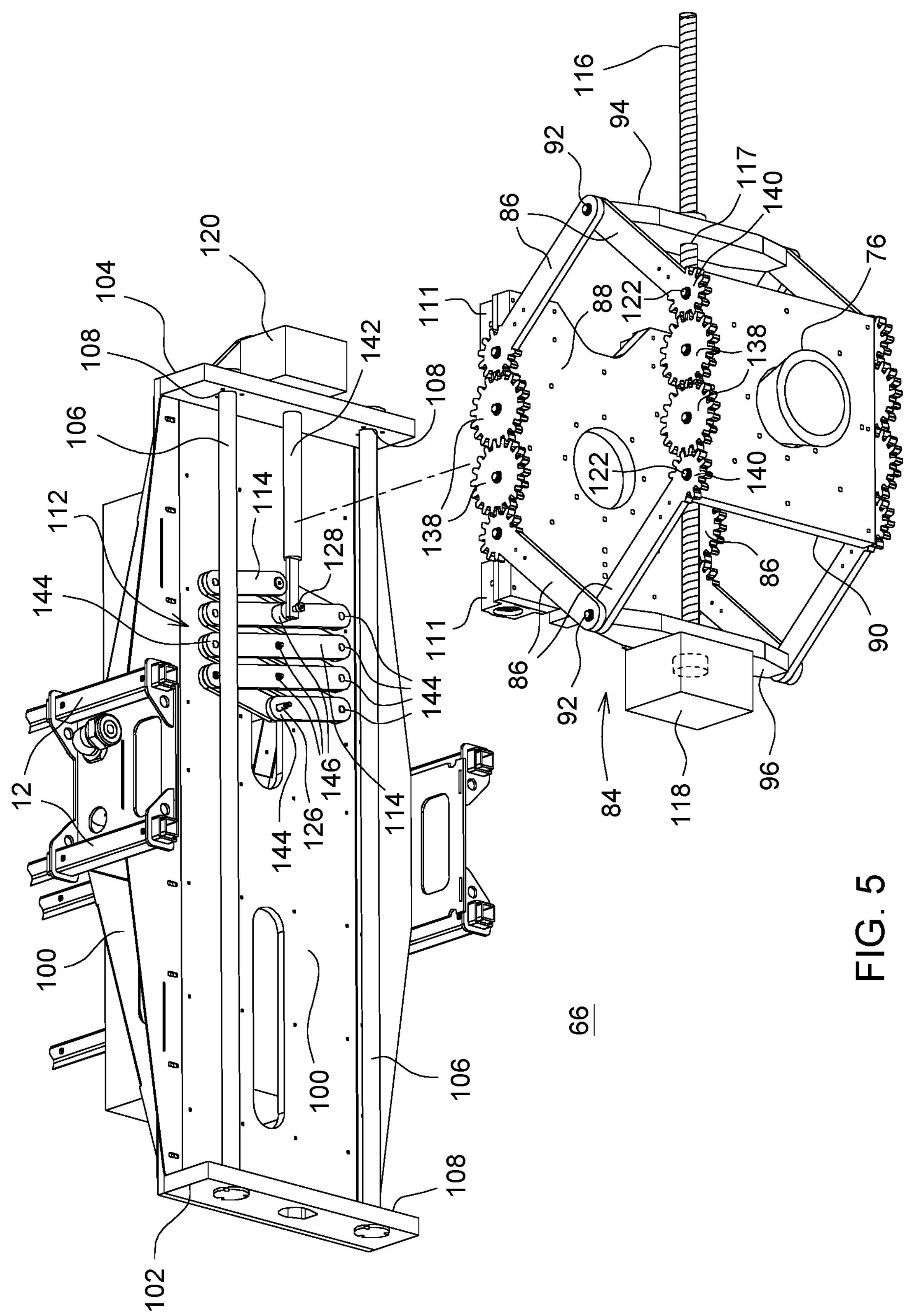
FIG. 5 is an exploded perspective view of a lower side of the lower carriage consistent with FIG. 4.

As best illustrated in FIG. 4 and FIG. 5, in each row unit (63, 65) the second position adjuster 70 comprises a frame 100 that is coupled for relative longitudinal movement with respect to the first position adjuster 68. A first end 102 is attached to or integral with one side of the frame 100. A second end 104 is attached to or integral with an opposite side of the frame 100 with respect to the first end 102.

A rod 106 or rail extends between the first end 102 and the second end 104, where the rod 106 or rail may be inserted into a recess 108 or socket in the first end 102 and the second end 104 for retaining the rod 106 or rail. An upper surface of the upper platform 88 supports four bushings 111 with openings 110 (e.g., substantially cylindrical openings or polygonal openings 110) corresponding in size and shape to the cross section of the rods 106 or rails. Bushings 111 are affixed to the first position adjuster 68 for engaging or slidably guiding the rod 106 or rail. For example, the bushings 111 may have an opening 110 that conforms to the shape and size of the cross-section of the rod 106 or rail for slidable engagement therewith. The openings 110 may contain bushings 111 or bearings and may be lubricated with oil, grease, or other lubricant.

A second scissors linkage 112 has a first coupling point (e.g., at end 126) to the first position adjuster 68 and a second coupling point (e.g., at end 128) to a link member 142. A second adjustment actuator 120 or linear actuator is adapted to provide a linear motion to the link member 142 such that the first position adjuster 68 is longitudinally displaced or adjusted with respect to the frame 100, or the second position adjuster 70.

In alternate embodiments, the second adjustment actuator 120 may comprise a linear actuator with ends coupled between two opposite end pivot points 144 of the second scissors linkage 112, near the end 126.

In one configuration, a set of one or more nozzles 76 are located on the second position adjuster 70. A nozzle 76 located on the second position adjuster 70 can be adjusted along a longitudinal axis, for instance.

An implement node system 132, a slave node controller 801, or a data processor 903 controls or supervises an upper controller, a first adjustment controller 72 and a second adjustment controller 74 for the each row unit (63, 65), where each row unit (63, 65) can be controlled independently within a positional range (e.g. lateral range) that avoids collision or interference with adjacent row units. An upper motor controller 17 provides a lateral control signal to the upper motor 16 to control a lateral position of a nozzle 76 on the lower carriage 66. A first adjustment controller 72 provides a height control signal to the first adjustment actuator 118 to control a height position of the nozzle 76 on the lower carriage 66. A second adjustment controller 74 provides a longitudinal control signal to the second adjustment actuator 120 to control a longitudinal position of the nozzle 76 on the lower carriage 66. For instance, the upper controller, the first adjustment controller 72 and the second adjustment controller 74 can simultaneously and dynamically adjust in real time a three-dimensional position of the nozzle 76 through control of the lateral position, the height position and the longitudinal position, even as the sprayer vehicle 11 progresses through the field.

In one embodiment, the upper carriage 18 is laterally movable along the beam 10 (along Y axis 80) and a lower carriage 66 suspended from the upper carriage 18 by a plurality of vertical supports 13 13, such as rods, rails, cylindrical members, beams, or other supports. A target lateral position of the upper carriage 18 generally establishes an actual lateral position of the lower carriage 66.

In certain embodiments, the vertical supports 13 may be composed of metal, alloys, plastic, polymers, plastic composites, polymer composites, fiberglass, carbon fiber or carbon fiber in a resin matrix.

In one embodiment, the data processor 903 compensates for a potential offset or lateral offset between the target lateral position and the actual lateral position, including misalignment or bending of the vertical supports 13 (e.g., damaged by interaction with the ground at operational vehicle speeds). The lower carriage 66 is suspended by the supports 64 from the upper carriage 18. In one embodiment, the upper carriage 18 can set, adjust or establish the Y axis 80 position of the lower carriage 66 because the lower carriage 66 tracks the Y axis 80 position of the upper carriage 18 with substantially no Y axis 80 offset or one or more of the following: a fixed Y axis 80 offset or a fixed three-dimensional offset of the z, y and z axes.

A second position adjuster 70 or second adjustment assembly can adjust the for-and-aft position of the nozzle 76, or the longitudinal position of the first position adjuster 68. During some maneuvers or movement of the vehicle, the for-and-aft position or longitudinal position may not coincide with the heading, yaw or direction of travel of the vehicle (e.g., where the vehicle moves diagonally or where the previous front of the vehicle becomes the rear), such that the second position adjuster 70 can keep the nozzle 76 aligned with respect to one or more target rows of plants. The second position adjuster 70 comprises a frame 100 with a first end 102 and second end 104. The first end 102 and the second end 104 are attached to the frame 100 or are integral with the frame 100. The frame 100 supports two parallel sets of rods 106 or rails. For example, the rods 106 or rails can be attached at their ends to the first end 102 and the second end 104, where the rods 106 or rails may be inserted into a socket or retention recess 108.

In one embodiment, a second scissors linkage 112 is positioned in a recess 108 or spatial zone defined by or between the upper platform 88 and the frame 100. One end 126 of the second scissors linkage 112 is connected to the upper platform 88, whereas another end 128 of the second scissors linkage 112 is connected to link member 142, which is movable by the second adjustment actuator 120. The second adjustment controller 74 can instruct the second adjustment actuator 120 to move the second scissors linkage 112 from a contracted position along the X axis 78 to an expanded position along the X axis 78, or vice versa, where the difference between the fully contracted position and the fully expanded position defines the maximum range of travel for the second position adjuster 70. As illustrated the second scissors linkage 112 comprises a series of beams 114 that are joined together at central pivot points 146 and outer pivot points 144, where the second scissors linkage 112 can expand and contract in an accordion-like manner in response to movement by the second adjustment actuator 120. The second scissor linkage 112 can act as a stroke multiplier to increases the amount of output displacement in the longitudinal or X axis 78 direction for a lesser input displacement of the linear actuator or second adjustment actuator 120 in the X direction.

In one embodiment, the second adjustment actuator 120 is attached to the frame 100 or to the second end 104. For example, the second adjustment actuator 120 may comprises a longitudinal adjustment linear actuator or longitudinal adjustment motor associated with a link member 142, such as a linkage, rod, shaft or threaded rod 116.

In an alternate embodiment, the second adjustment actuator 120 comprises a linear actuator that is connected or coupled between two outer pivot points 144 at one terminating end of the second scissors linkage 112, whereas the other terminating end of the second scissors linkage 112 is coupled to the platform or the second end 104.

In another alternate embodiment, a combination of a threaded rod and motor can be coupled between the two outer pivot points 144 at a terminating end 128 of the second scissors linkage 112, whereas the other terminating end 126 of the scissors linkage 112 is coupled to the upper platform 88. Near the end 128 at one outer pivot point 144, a coupler has a shaft on one side for engagement with the outer pivot point 144 and threaded recess with a recess axis that is substantially orthogonal to the shaft axis of the shaft; the second adjustment actuator 120 comprises the motor that rotates a threaded shaft in the threaded recess such that the second scissor mechanism acts as a stroke multiplier.

Although other configurations are possible, in one illustrative configuration the maximum range of travel for the second position adjuster 70 is approximately 18 inches along the longitudinal axis, and the maximum range of travel for the first position adjuster 68 is approximately 12 inches along the vertical axis.

In an alternate embodiment, the second position adjuster 70 can be rotated 90 degrees in the x-y plane with respect to the first position adjuster 68 to adjust the first position adjuster 68 or its upper platform 88 along the lateral or Y axis 80, instead of the X axis 78. In this document, the second position adjuster 70 that is rotated 90 degrees in the x-y plane can be referred to at the third position adjuster. Further, in the alternate embodiment, the upper carriage 18 may be used to perform coarse adjustments to the Y axis 80 or within a first limited range, whereas the lower carriage 66 may be used to perform fine adjustments to the Y axis 80 within second limited range, where the first limited range and the second limited range overlap or are mutually exclusive ranges along the Y axis 80.

Imaging System

In one embodiment, an imaging system comprises an imaging device 124 and an associated image processing module 911 in the data master data processing system 902 or its data storage device 906. The imaging device 124 may comprise a monocular or stereo imaging system for collecting image data on the spatial alignment of the lower carriage 66 with respect to one or more plants 148 or rows of plants 148. In one configuration, the imaging system may comprises the imaging device 124 (e.g., digital stereo camera) and an image processing module 911 to distinguish plant pixels from background 150 pixels in the collected image data, to distinguish the lower carriage 66 from plant pixels and background pixels, and to estimate a three-dimensional representation (e.g., three dimensional constellation of pixels or voxels) of the lower carriage 66 with respect to the one or more plant rows.

An upper motor controller 17 can provide a control signal to control the upper motor 16 to position a nozzle 76 on the lower carriage 66 in accordance with a target lateral separation to a row of plants 148. The control signal is responsive to the collected image data. The lower carriage 66 supports 64 movement of a three-dimensional position of a nozzle 76 on the lower carriage 66 by a first position adjuster 68 for adjusting height of the nozzle 76 and a second position adjuster 70 for adjusting a longitudinal position of the nozzle 76 based on the collected image data. The height is adjusted to maintain a minimum height clearance with respect to the ground 150 and to maintain a relative height to a peak plant height, an average or median foliage height, or peak leaf canopy height based on image data. The lower carriage 66 supports movement of a three-dimensional position of a nozzle 76 on the lower carriage 66 by the second position adjuster 70 for adjusting a longitudinal position of the nozzle 76 to reduce or minimize a longitudinal offset between the nozzle 76 and plant stem or central plant portion.

In one embodiment, the lower carriage 66 or implement carriage supports vertical position adjustment and fore-and-aft (longitudinal) position adjustments via a first position adjuster 68 and a second position adjuster 70.

In an alternate embodiment, the lower carriage 66 or implement carriage supports vertical position adjustment and lateral position adjustment via first position adjuster 68 and a third position adjuster.

In one embodiment, the first position adjuster 68 or first adjustment assembly comprises a first scissors linkage 84 with four pairs of legs 86, an upper platform 88 and a lower platform 90. The legs 86 or leg segments are rotatably connected to each other at central joints and the upper platform 88 and lower platform 90 at other joints. For example, upper legs 86 are rotatably connected to the upper platform 88. Lower legs 86 are rotatably connected to the lower platform 90. The upper and lower legs 86 are joined at central pivot points 92 or central joints.

A first pair of central joints are connected by a corresponding first support member 94 and a second pair of central joints are connected by a second support member 96. For example, a pin, shaft, or bolt extends through bores of the legs 86 at the central joints and into a recess (e.g., threaded recess of) the respective first support member 94 or respective second support member 96. As illustrated in FIG. 4 and FIG. 5, the first support member 94 and the second support member 96 have bores at opposite ends of the first scissor linkage and at least one of the bores is arranged to receive a threaded rod, a shaft, bolt, pin or cylindrical member. The first support member 94 has a threaded bore 117 for receiving a threaded rod 116 that extends between the first support member 94 and the second support member 96, or the first adjustment actuator 118 attached to the threaded rod 116.

In one embodiment, the first adjustment actuator 118 comprises an electric motor, a step motor, or a servo-motor.

In an alternate embodiment, the vertical adjustment motor is replaced by a vertical adjustment linear actuator that is mounted to the first support or the second support, with a rod mounted to the opposite one of the first support and second support.

FIG. 6 is a block diagram of one embodiment of the electrical or electronic system 600 for the sprayer that uses wireless communications. As illustrated, the electronic system 600 of FIG. 6 comprises a drive node system 130, an implement node system 132 and master node system 134 that can communicate with each other via any two or more of the wireless communication devices.

The master node system 134 includes a master data processing system 902 that is shown in greater detail in FIG. 7. The master node system 134 or master data processing system 902 comprises a mission planning module 909, a path tracking module 917, a path planning module 910, and a navigation module 907. The mission planning module 909 plans a mission of the sprayer module to treat a field, zones of the field, particular plants 148 or particular target portions of plants 148 within the field or zone. For example, the mission plan may assign a three dimensional coordinate for or more nozzles 76 of each row unit for a corresponding location and attitude orientation of the sprayer vehicle in the field. The image processing system (124, 911, collectively) assists the mission planning module 909 is adjusting the three-dimensional coordinates for one or more nozzles 76 of each field or zone in accordance with image data to achieve the mission plan or targeted application of crop inputs to the plants 148, zones of plants 148, or portions of plants 148 or rows in the field within a certain targeted range of height, lateral, and longitudinal orientation. The path planning module 910 provides a path plan for the sprayer vehicle to follow to execute the mission plan and to track rows and to cover a targeted area of the field, given the field boundaries, keep-out zones and other constraints along with position data and attitude data for the sprayer vehicle as it traverses the field or work area. The navigation module 907 facilitates switching between an automated driving mode and manned mode, or obstacle avoidance based on position data, heading data, velocity data, acceleration data from one or more location-determining receivers (e.g., satellite navigation receivers) and any reliable image data from an image processing device that is suitable for navigation. The path tracking module 917 facilitates the sprayer vehicle adhering to the path plan with minimal tracking error, such as lateral error between a target path plan and an actual path of the vehicle.

In one configuration, a drive node system 130 comprises a control system controls the first drive motor 48, the second drive motor 50, or both. Further, in an alternate embodiment, the driver node system 130 may control a first drive motor 48 for rotating a first wheel, a second drive motor 50 for rotating a second wheel. Alternately, first drive motors 48 can rotate multiple wheels or left wheels, whereas second drive motors 50 can rotate multiple right wheels or second wheels. A first motor controller 52 provides a control signal or control data message to the respective first drive motor 48. A second motor controller 52 provides a control signal or control data message to the respective second drive motor 50.

The slave node controller 801 or the master node system 134 processing system provide control signals or data messages to first motor controller 52 and the second motor controller 54 to control the first drive motor 48 and the second drive motor 50 based on position data and attitude data (associated with the beam 10 of the vehicle from the location-determining receiver or receivers, 22, 24) and one or more of the following: a mission plan of a mission planning module 909, a path plan of path planning module 910, a path tracking instructions of a path tracking module 917, and navigation instructions of a navigation module 907.

The implement node system 132 comprises an upper motor 16 (e.g., an X axis 78 motor), a first adjustment actuator 118 (e.g., Y axis 80 motor), a second adjustment actuator 120 (e.g., a Z axis 82 motor) that are separately controlled by an upper motor controller 17, a first adjustment controller 72, and a second adjustment controller 74, respectively. The slave node controller 801 or the master data processing system 902 provides control data messages to the upper motor controller 17, the first adjustment controller 72, and the second adjustment controller 74 to move each row unit to a targeted three-dimensional position of the lower carriage 66 or its one or more nozzles 76. For example, the mission plan may assign a three dimensional coordinate for or more nozzles 76 of each row unit for a corresponding location and attitude orientation of the sprayer vehicle in the field. The image processing system assists the mission planning module 909 is adjusting the three-dimensional coordinates for one or more nozzles 76 of each field or zone in accordance with image data to achieve the mission plan or targeted application of crop inputs to the plants 148, zones of plants 148, or portions of plants 148 or rows in the field within a certain targeted range of height, lateral, and longitudinal orientation.

FIG. 7 is a block diagram of another embodiment of the electrical or electronic system 700 for the sprayer. Like reference numbers in FIG. 6 and FIG. 7 indicate like elements or features.

In one configuration, the first location-determining receiver 22 is illustrated with an optional second antenna 901 that is spaced apart from its first antenna along the beam 10 of the sprayer vehicle 11. The second antenna 901 is optional as indicated by the dashed lines. The first antenna and the second antenna 901 may be time-division multiplexed to receive multiple satellite channels at the first location-determining receiver 22 such that the attitude of the beam 10 can be determined by single first location-determining receiver 22, alone or in conjunction with the attitude angle estimator 908.

Alternately, the first location-determining receiver 22 and the second location-determining receiver 24 are spaced apart by a fixed known baseline difference, or rather their antennas are spaced apart along the beam 10, to facilitate simultaneous estimation of positions that can be used by the attitude angle estimator 908 to derive the attitude of the beam 10.

The master data processing system 902 comprises an electronic data processor 903, a data storage device 906, and data ports 904 coupled to a data bus 905, were the electronic data processor 903, the data storage device 906 and the data ports 904 can communicate with each other over the data bus 905.

In one embodiment, the electronic data processor 903 comprises a microprocessor, a microcontroller, a digital signal processor, an application specific integrated circuit, a programmable logic array, a logic circuit, an arithmetic logic unit, a Boolean logic circuit or another data processing device.

The data storage device 906 may comprise electronic memory, nonvolatile electronic random access memory, a magnetic storage device, an optical storage device, a magnetic disk drive, or the like.

The data storage device 906 may store software instructions or data (e.g., data structures or look-up tables) for any of the following: a navigation module 907, an attitude angle estimator 908, a mission planning module 909, a path planning module 910, an image processing module 911, a plant (row) position estimator 912 and an adjustment control module 913. As used in this document, a module may refer to hardware, software, or a combination of software and hardware.

In one configuration, the plant row position estimator 912 determines or estimates the two or more coordinates that defines a generally linear center of the plants 148 within a row, or a constellation, cloud, or other three dimensional representation (e.g., height, depth and width or expressed in terms of x, y and z coordinates) of pixels or voxels of the leaves, stems, canopy, or foliage of the plants 148 in one or more rows. The plant row estimator 912 may estimate two or more coordinates that defines a generally linear center of the plants 148 within a row, or a constellation, cloud, or other three dimensional representation based upon image data collected by the imaging device 124 and image processing of the master data processing system 902. Further, the plant row estimator 912 may use pre-existing knowledge of the row spacing used by the planter for planting the seeds or plants 148, along with an as-planted map of the seed positions or seed locations, where available.

The adjustment control module 913 provides control signals or control data messages to the upper motor controller 17, the first adjustment controller 72, and the second adjustment controller 74 via the data ports 904 and vehicle data bus 914 or a two or more wireless communications devices 805 in response to image data from the imaging device 124, or other sensor data. Similarly, the navigation module 907, mission planning module 909 or path planning module 910 can provide control signals or control data messages to the first motor controller 52 and the second motor controller 54 via the data ports 904 and vehicle data bus 914 or a two or more wireless communications devices 805 in response to position data and attitude of the beam 10 or sprayer vehicle.

In one embodiment, for spraying operations the mission planning module 909 or the electronic data processor 903 generates or receives a spraying plan, such as a spraying plan versus position in the field or zone within field, such as on a row-by-row basis or section of a row basis. Then, the mission planning module 909 or the electronic data processor 903 can send control signals or data messages based on the spraying plan to a first electrohydraulic valve 81 and a second electrohydraulic valve 83 associated with each sprayer row unit connected to the vehicle 11 as the vehicle 11 progresses through the field based on an observed position of one or more location-determining receivers (22, 24). For example, the first electrohydraulic valve 81 and the second electrohydraulic valve 83 are integral with the first nozzle 176 and second nozzle 276, respectively, to control fluid emitted from the nozzles, or the valves can be associated with manifold 678 to control fluid supplied to the first nozzle 176 and the second nozzle 276 via tubes 679 (in FIG. 15) in accordance with the spraying plan versus observed field position.

In another embodiment, for planting or seeding operations the mission planning module 909 or electronic data processor 903 generates or receives a planting plan, such as a planting plan versus position in the field or zone within field, such as on a row-by-row basis or section of a row basis. Then, the mission planning module 909 or the electronic data processor 903 can send control signals or data messages based on the planting plan to a planting device 681, a seed metering device 673 and/or an electric motor 756 for a tiller associated with each planter row unit 691 connected to the vehicle 11 as the vehicle 11 progresses through the field based on an observed position of one or more location-determining receivers (22, 24). For example, the electronic data processor 903 can send control signals to the seed metering devices 673 of multiple planter row units 691 on a row-by-row or section of a row basis to vary the seeding density or spacing in accordance with the planting plan versus observed field position.

Figure 8B:
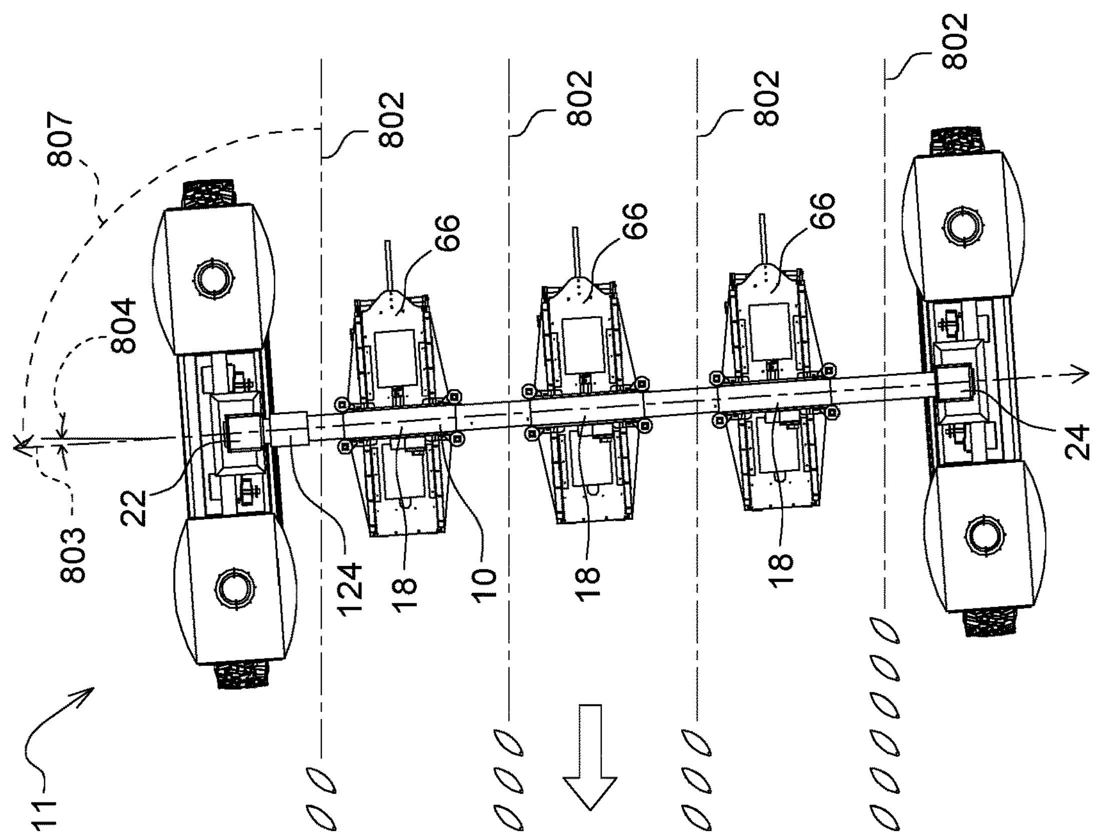
FIG. 8B is a plan view of an embodiment of the sprayer vehicle with a heading or yaw angle that is misaligned with plant rows in a field.
Figure 8A:
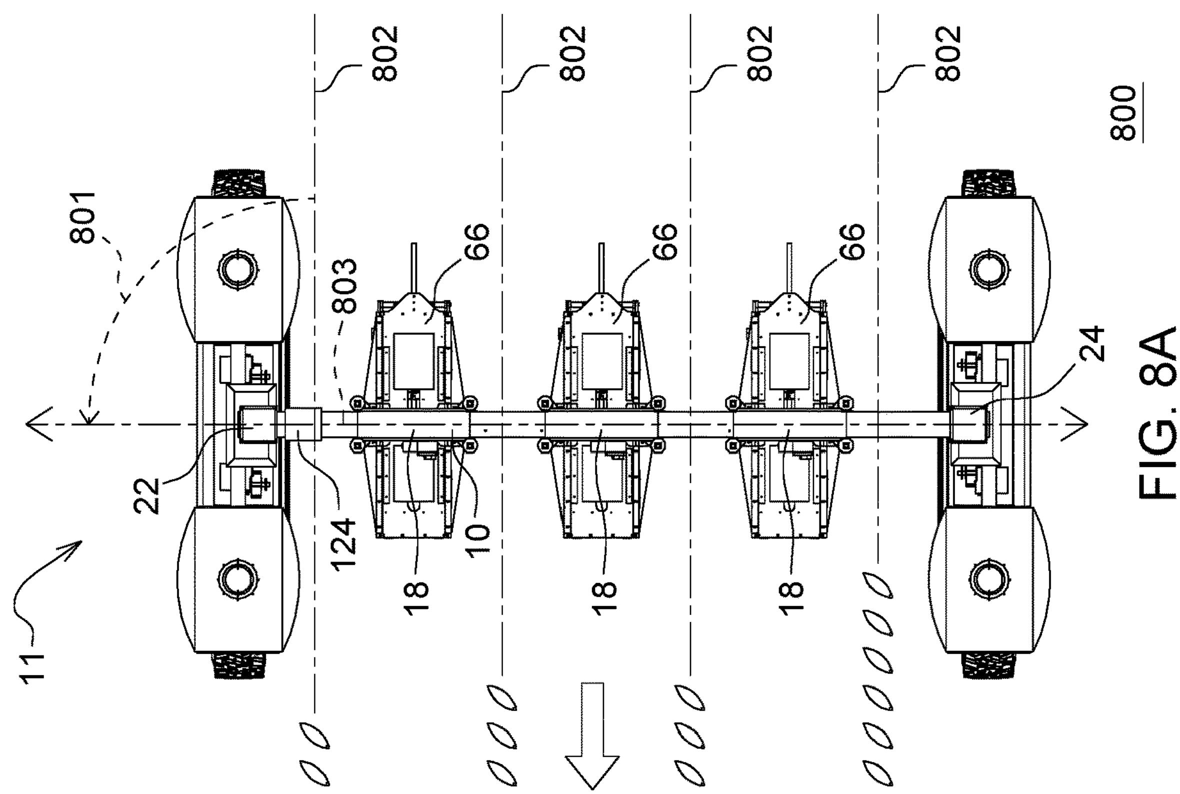
FIG. 8A is a plan view of an embodiment of the sprayer vehicle with a heading or yaw angle that is aligned with plant rows in a field.

FIG. 8A and FIG. 8B are a plan views of an embodiment of the sprayer vehicle 11. Like reference numbers indicate like elements or features in FIG. 1, FIG. 8A and FIG. 8B.

In FIG. 8A and FIG. 8B the sprayer vehicle 11 is traveling forward in leftward direction as indicated by the arrow. A beam axis 803 extends lengthwise through the beam 10 and is coextensive with the Y axis, as illustrated in FIG. 1 in combination with FIG. 8A. The plant rows 802 are generally linear and substantially parallel to each other in FIG. 8A and FIG. 8B.

In FIG. 8A the sprayer vehicle 11 has heading or yaw angle that is aligned with the plant rows 802 in the field in accordance with a path plan. For example, as illustrated, the heading or yaw angle is aligned with the plant rows when the observed angle 801 between a representative plant row 802 and the beam axis 803 or the Y axis is approximately ninety degrees or a right angle. As a component of the vehicle attitude, the heading or yaw angle can be estimated by the location-determining receivers (22, 24) as previously described.

FIG. 8B is a plan view of an embodiment of the sprayer vehicle 11 with a heading or yaw angle that is misaligned with plant rows 802 in a field. For example, the observed angle 807 between the plant row 802 and the beam axis 803 or the Y axis is no longer approximately ninety degrees or a right angle. Instead, there is a heading error angle 804 that can be modeled as the difference between ninety degrees and the actual observed angle 807 between the plant row and the beam axis 803 or the Y axis.

The location-determining receivers (22, 24) provide the attitude of the beam 10 or sprayer vehicle 11, where the attitude includes the yaw angle or heading angle among other things. The master node system 134 comprises a path tracking module 917 that facilitates tracking of a path plan and minimizing or reduction of an heading error that might otherwise result in inaccurate application of crop inputs because of lagging side or leading side of the sprayer vehicle 11 is misaligned by the heading error angle 804 and an associated error offset distance with respect to a target zone of a spraying prescription that requires a particular corresponding dosage, concentration or rate of applied crop input.

Figure 9:
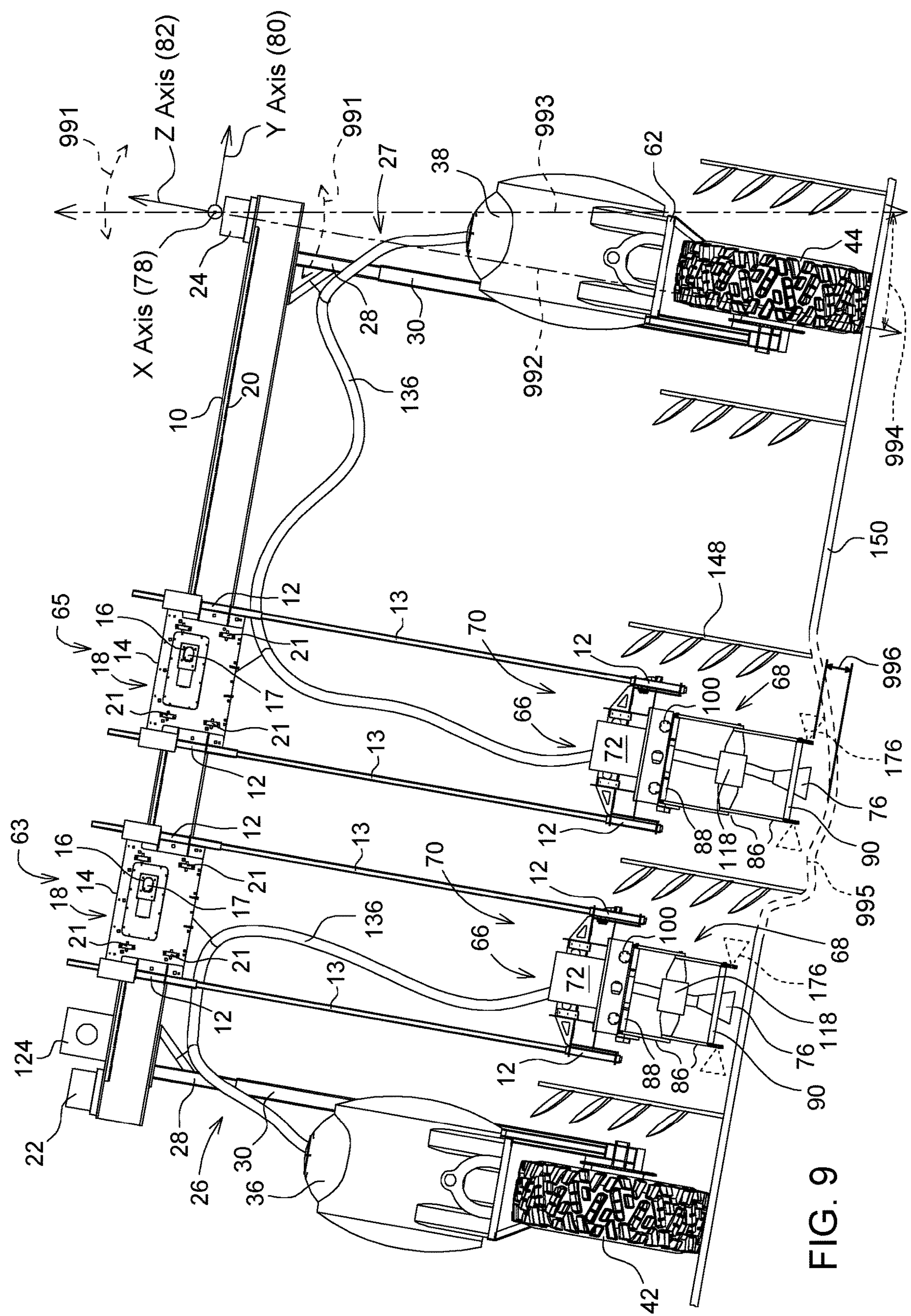
FIG. 9 is a front elevation view of the sprayer vehicle on a transversely sloped ground with a depression beneath one row unit.

FIG. 9 is a front elevation view of the sprayer vehicle 11 on a transversely sloped ground with a depression 995 beneath one row unit. FIG. 9 is similar to FIG. 2 except the sprayer vehicle 11 is on transversely sloped ground 150 that slopes downward to the right. Further, the second row unit 65 is in a depression 995. The first position adjuster 68 of the first row unit 63 is adjusted to a different height than the first position adjuster 68 of the second row unit 65. For example, the first position adjuster 68 of the second row unit 65 may expanded downward toward the ground or depression 955 along the Z axis more than the first position adjuster 68 of the first row unit 63, such that a target height 996 (e.g., uniform height) is kept between the ground or depression 955 and the bottom of each row unit (63, 65) or nozzle (76, 176), or such that a uniform height is kept between the nozzles (76, 176) of the respective row units and corresponding plants in the rows.

FIG. 9 illustrates position error of the location-determining receiver (22, 24) on a transversely sloped ground 150 that is compensated for by the observed attitude or observed roll determined by one or more of the location-determining receivers (22, 24).

In alternate embodiments, the roll angle of the sprayer vehicle 10 may be estimated by one or more accelerometers or gyroscopes.

The location determining receiver (22, 24), the path tracking module 917, the navigation module 907 or the data processor 903 can determine a position difference between the Z-axis (which is relative to the sprayer vehicle 10) and a normal axis that is perpendicular to the ground 150 or surface of the Earth. The position difference can be used to generate a correction such that the sprayer vehicle 10 is properly aligned with the plant rows 148 in accordance with a path plan.

Figure 10:
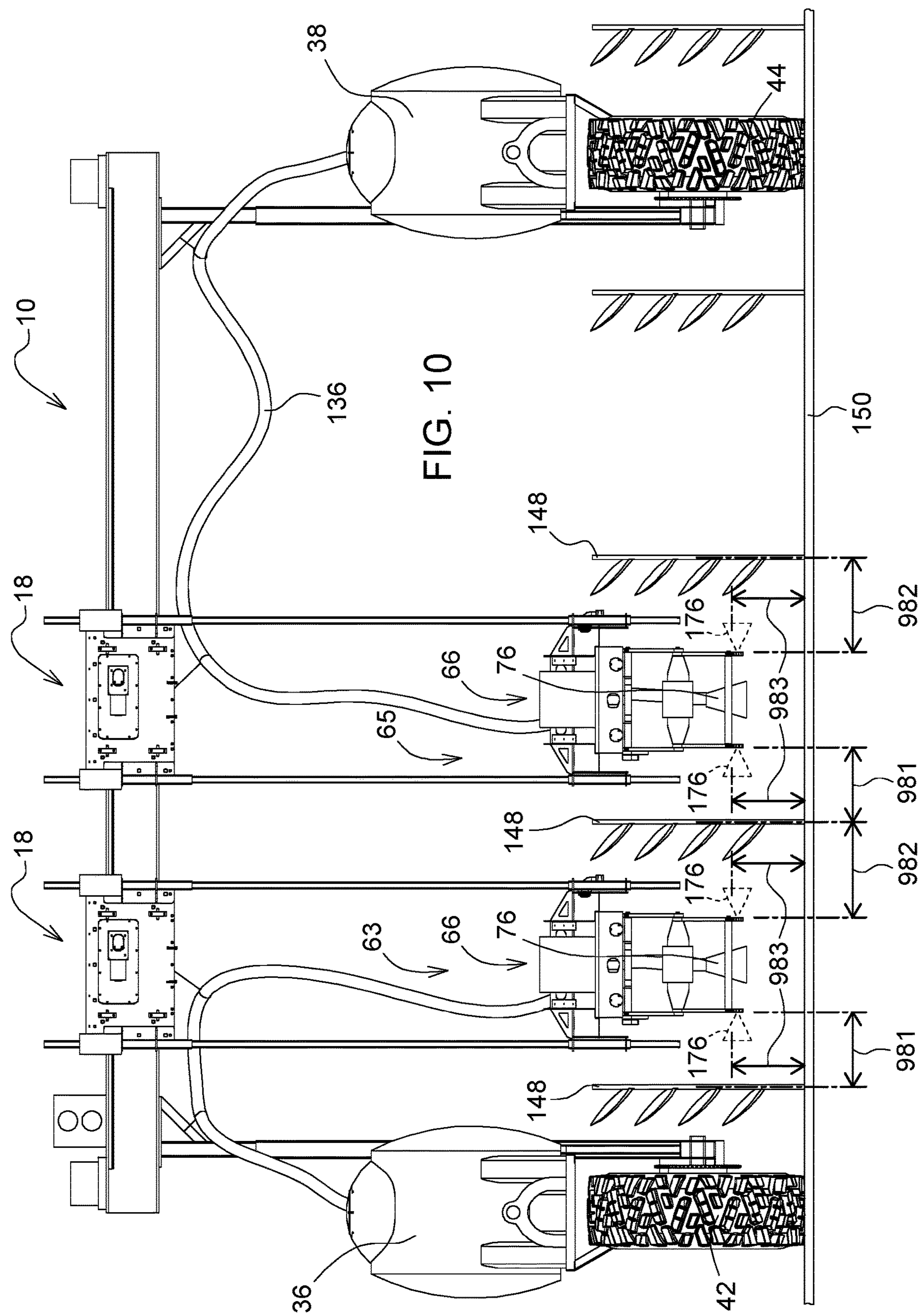
FIG. 10 is front elevation view of the sprayer vehicle with target separation distances illustrated between the nozzle and ground and between the nozzle and plant rows.

FIG. 10 is similar to FIG. 2 except the one or more spatial dimensions of the nozzle are observed with reference to plant rows and the ground. Like reference numbers in FIG. 10 and FIG. 2 indicate like elements or features.

FIG. 10 is front elevation view of the sprayer vehicle 10 with a vertical target height 176 between the nozzle (76, 176) and ground 150 or with a vertical target height 176 with respect to a peak plant height, a median plant height or an average plant height for the plant row 148 based on a three dimensional representation of the plant from collected image data. A first lateral target separation distance 981 represents a distance between a first nozzle 176 and the plant row, plant row center, plant center, plant stem, plant stalk, or plant trunk. A second lateral target separation distance 982 represents a distance between a second nozzle 176 and the plant row, plant row center, plant center, plant stem, plant stalk, or plant trunk on the same lower carriage 66 as the first nozzle 176. As illustrated in FIG. 10, the first lateral target separation distance 981 is between a left plant row 148 and the first nozzle 176 of a row unit, whereas the second lateral target separation distance 982 is between the second nozzle 176 and a right plant row 148 adjacent to the left plant row of the same row unit.

In one example, the first position adjuster 68 can adjust the nozzles (76, 176) to be located at a target height above the ground 150 or with respect to a plant height of plant row 148. In another example, the upper carriage 18, or upper motor controller 17 in conjunction with the upper motor 16, can adjust the nozzles (76, 176) to be located at certain lateral spacing or lateral distance (981, 982) between the plant, plant center, plant row center, plant stem, plant trunk, plant stalk, plant row, plant root zone, or other reference point associated with the plant. In one embodiment, the reference points (three-dimensional coordinates) associated with plant can be based on a three-dimensional representation of plant pixels or voxels, such as a constellation or cloud of plant pixels defined in three dimensional coordinates that derived from stereo image data collected and processed by the image processing system.

Figure 11:
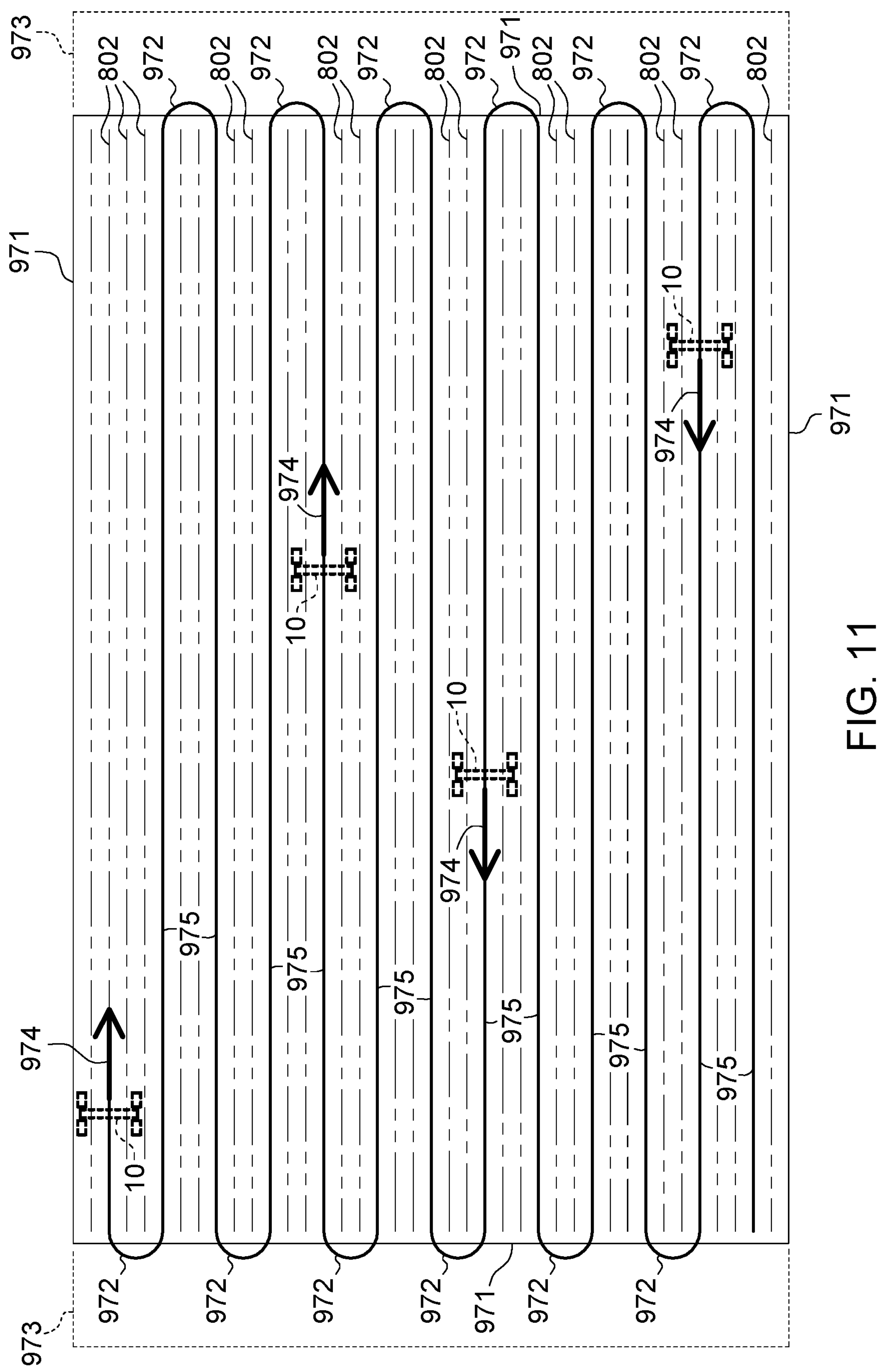
FIG. 11 is a plan view of a sprayer vehicle in an illustrative field following a path plan to treat or spray an area of a field.

FIG. 11 is a plan view of a sprayer vehicle 10 in an illustrative field of plant rows 802 following a path plan (975, 972) to treat or spray an area of a field. The sprayer vehicle 10 follows a path plan that comprises generally parallel linear segments 975 within a field with a field boundary 971, where the linear segments 975 are interconnected by row end turns 972 in headlands 973, a work area, or in other regions adjoining the field. The direction of travel of the sprayer vehicle 10 is indicated by the arrow 974.

The path plan of FIG. 11 is merely representative of one possible path plan to cover the area of the field and other path plans can fall within the scope of this document and the accompanying claims.

Figure 12:
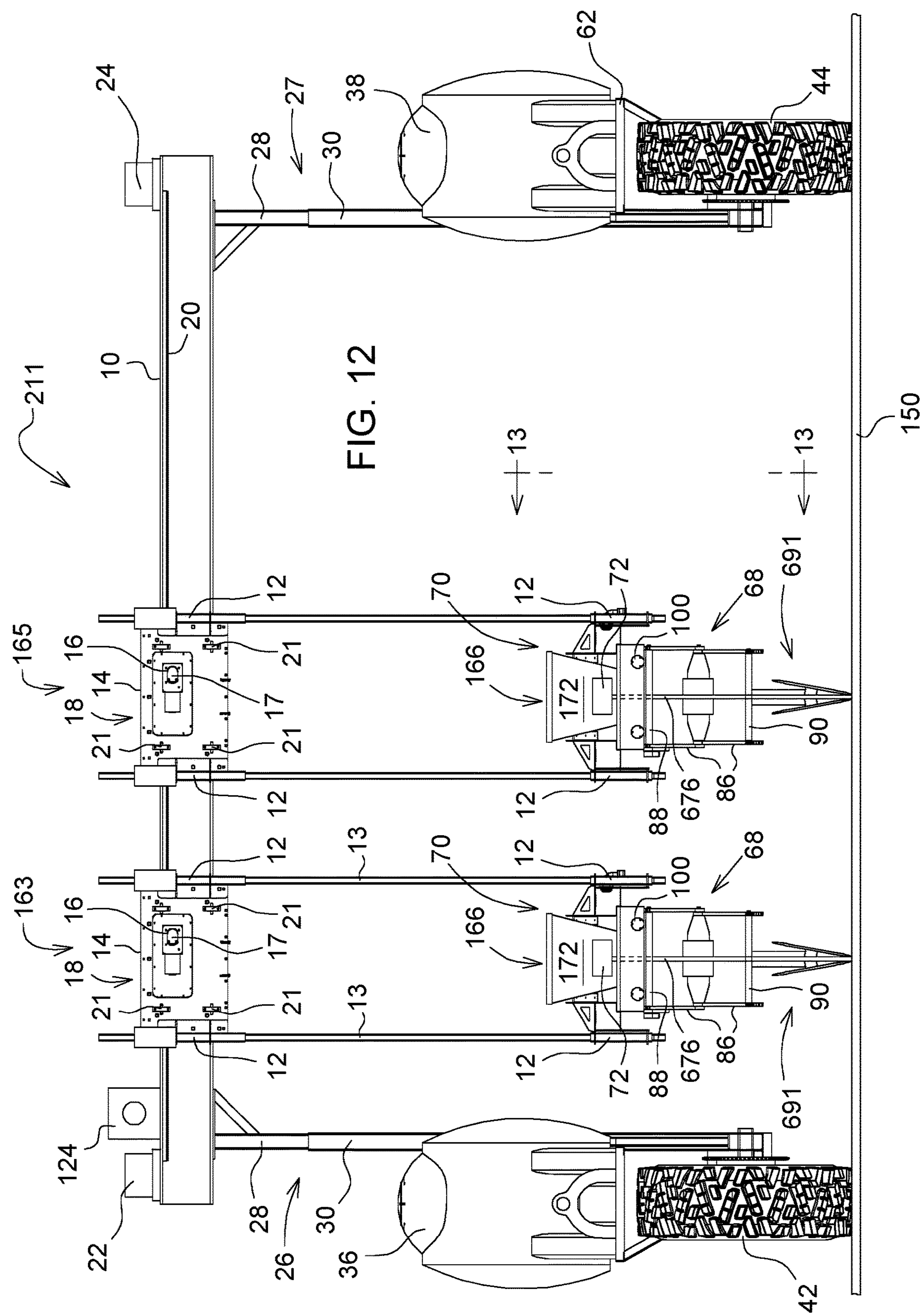
FIG. 12 is a front elevation view of a planter vehicle with two illustrative planter row units.

FIG. 12 is a front elevation view of a planter vehicle 211 with two illustrative planter row units 691. For some embodiments, the planter row units 691 may also be referred to as planting devices. The planter vehicle 211 of FIG. 12 is similar to the sprayer vehicle 11 or agricultural vehicle of FIG. 1, except the lower carriage 66 of FIG. 1 is replaced with a lower carriage 166 in FIG. 12. The lower carriage 166 is similar to the lower carriage 66, except that the lower carriage 166 is configured as a planter and has a seed bin 172 for feeding a respective planter row unit 691 via a seed tube 676. Each planter row unit 691 has a planting device with an adjustable position in one or more dimensions with respect to the beam 10. For example, the first row unit comprises a first planting device and the second row unit comprises a second planting device.

Although the seed bin 172 is associated with a respective planter row unit 691, in alternate embodiments, tanks 36 and 38 may be replaced by one or more central seed bins for pneumatically feeding each planter row unit 691 or the respective seed bins 172 of each planter row unit 691. For example, in an alternate embodiment a seed bin level sensor in each respective seed bin 172 can trigger the transfer for seeds from the central seed bin to the respective seed bins 172 via tubing.

Figure 13:
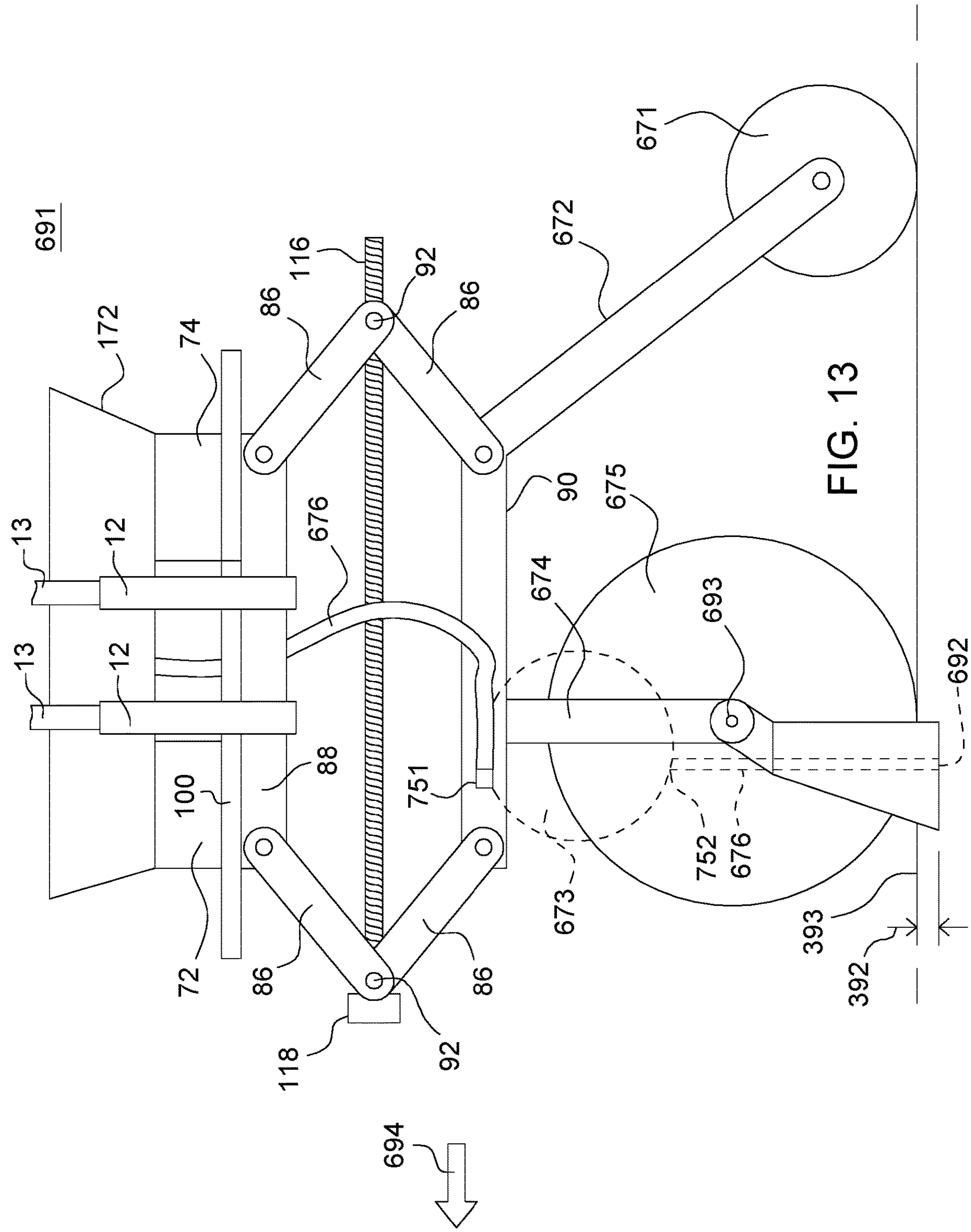
FIG. 13 is side view of a lower carriage of a planter row unit as viewed along reference line 13-13 of FIG. 12.

FIG. 13 is side view of a lower carriage 166 of a planter row unit 691 as viewed along reference line 13-13 of FIG. 12. In one embodiment, a planter row unit 691 comprises a movable lower carriage 166 suspended from the beam 10. A seed bin 172 is on the lower carriage 166. A seed metering device 673 receives seed from the seed bin 172 via a seed tube 676 and regulates the flow of seeds to a seed outlet to achieve an as-planted target seed density per row, per section of row, or seed density per unit land area of a field.

As illustrated in FIG. 12 and FIG. 13, the seed bin 172 is disposed above the first adjustment controller 72 and the second adjustment controller 74. Alternately, the seed bin 172 can be placed above batteries on the upper platform 88 or the frame 100. The seed bin 172 feeds an input port 751 of the seed metering device 673 via the tube 676. The seed metering device 673 controls the output rate of seed from an outlet port 752 of the seed metering device 673. The outlet port 752 of the seed metering device 673 is connected to seed tube 676 that terminates in an outlet 692, near an optional knife or optional cutting edge 676 at a depth 392 below a ground level 393 or ground height.

For each planter row unit 591, the seed metering device 673 supports control of an as-planted target seed density or seed-to-seed spacing in each row of planted seed. In one example, the seed metering device 673 can alter the output rate of seed from the outlet port 752 to compensate for changes in speed or velocity of the planter row unit 691 or the planter vehicle 211. In another example, the seed metering device 673 can alter the output rate of seed from the output port 752 to change the as-planted seed density in a row or in a section of a row in accordance with a seed planting plan or an agronomic prescription.

The planter row unit 691 is configured to move in the direction of travel shown by the arrow 694 during planting operations. However, during a pause in planting operations, during transit or during alignment for planting operations the planting vehicle 211 can move in virtually any direction without any practical distinction from the front or rear of the planting vehicle 211.

An opener 675, such as a disc or coulter, opens the soil for placement of the seeds from the outlet 692. The opener 675 may be stationary or may rotate with respect to a shaft 693. The opener 675 is supported by support member 674 that extends downward from the lower platform 90. The seed outlet 692 is positioned adjacent to or near the opener 675 for depositing seed into the opened soil. A trailing member 672 extends downward, rearward from a rear of the lower platform 90. The trailing member 672 supports a closer 671, which comprises a stationary or rotatable roller, a rotatable serrated wheel, or a wheel assembly for closing the soil after the seed is placed from the seed outlet 692 in the opened soil or furrow. In one configuration, the closer 671 is spaced apart longitudinally from the seed outlet 692 or opener 675 in the direction of travel of the agricultural machine.

In one embodiment, the first adjustment controller 72 or another data processor 903 can control the first adjustment actuator 118 on the lower carriage 166 to adjust the planting depth 392 of seed on a row-by-row basis or for a section of row of the planted seed by adjusting the depth 392 or height of the seed outlet 692, cutting edge 676, the opener 675 or other ground-engaging members. Similarly, the first adjustment controller 72 or another data processor 903 can control the first adjustment actuator 118 on the lower carriage 166 to adjust draft forces or imbalances in draft forces from different planter row units 691 by adjusting the depth 392 or the height of the seed outlet 692, cutting edge 676, the opener 675 or other ground-engaging members, such that the planter vehicle 691 tracks properly a target path plan, or a target heading (e.g., such that the draft forces on different row units are balanced collectively). The target path plan or target heading corresponds to the position (e.g., geographic coordinates) of the planter vehicle 211, or its row unit 691, associated with path plan, such as a generally linear parallel rows or swaths, contour paths, spiral paths, or other paths of the planter vehicle 691 to cover a field area.

During the planting, the second adjustment controller 74 or another data processor 903 can control the second adjustment actuator 120 to adjust or vary, independently and dynamically, the lateral position or offset of each planter row unit 691; hence, each planted seed or section of seeds within any row with respect to an adjacent row. Accordingly, the planter row units 691 can achieve collectively very precise patterns and targeted seed density for a given zone within a field, or can vary precisely the targeted seed density for corresponding zones in the field. For example, a first zone can have a first seed density within a first range (e.g., first tolerance expressed in seeds per land unit area), whereas a second zone can have a second seed density within a second range, where the first range is distinct from and does not overlap with the second range (e.g., second tolerance expressed in seeds per land unit area).

In one example, the first adjustment controller 72 or another data processor 903 can control the first adjustment actuator 118 on the lower carriage 166: (1) to adjust dynamically or statically the planting depth 392 (e.g., along the Z axis) of the seeds on a row-by-row basis or for a section of row of plants, or even for a single plant; or (2) to vary the height of the seed outlet 692, cutting edge 676, the opener 675 or other ground-engaging members to adjust thereby the correlated planting depth of seeds that is correlated to the aforementioned height. In another example, the second adjustment controller 74 or another data processor 903 can control the second adjustment actuator 120 (e.g., along the X axis) in the longitudinal direction of travel to adjust the longitudinal position of the seed outlet 692 or planted seeds on a row-by-row basis or for a section of row of plants, or even for a single plant. In still another example, the upper motor controller 17 can control the upper motor 16 to control the lateral position (e.g., along the Y axis) of the seed outlet 692 or seeds on a row-by-row basis or for a section of row of plants, or even for a single plant.

Figure 14:
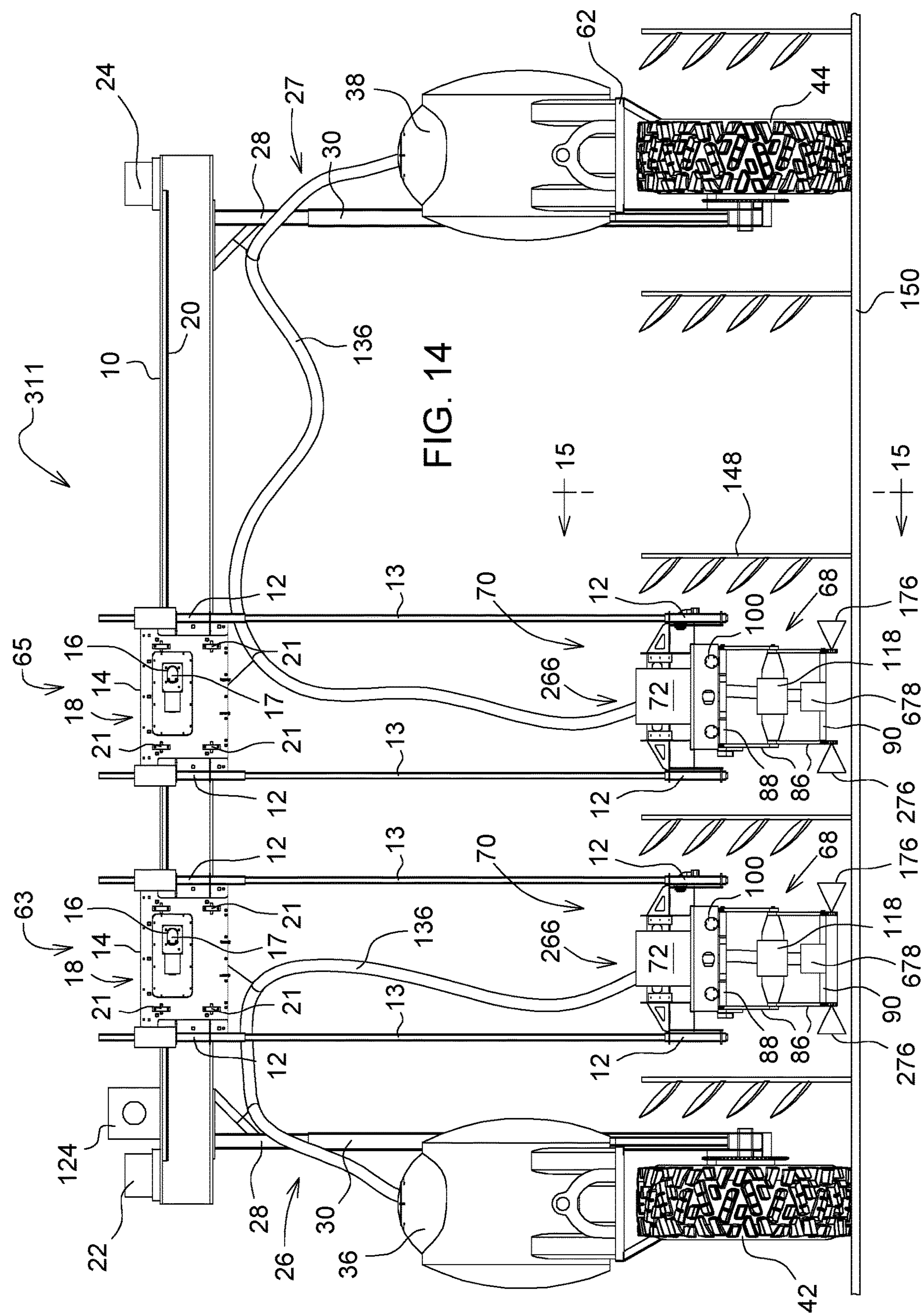
FIG. 14 is a front elevation view of a sprayer vehicle with two illustrative sprayer row units.

FIG. 14 is a front elevation view of a sprayer vehicle 311 with two illustrative sprayer row units shown. The sprayer vehicle of FIG. 14 is similar to the sprayer vehicle 11 of FIG. 1, except the lower carriage 266 of the sprayer row unit is configured with a set of nozzles (176, 276). As illustrated, the nozzles (e.g., first nozzle 176 and second nozzle 276) face generally opposite directions, where the nozzles 176 may be directed to cover planted seeds, soil or plants in adjacent rows or adjacent sections of a field.

Figure 15:
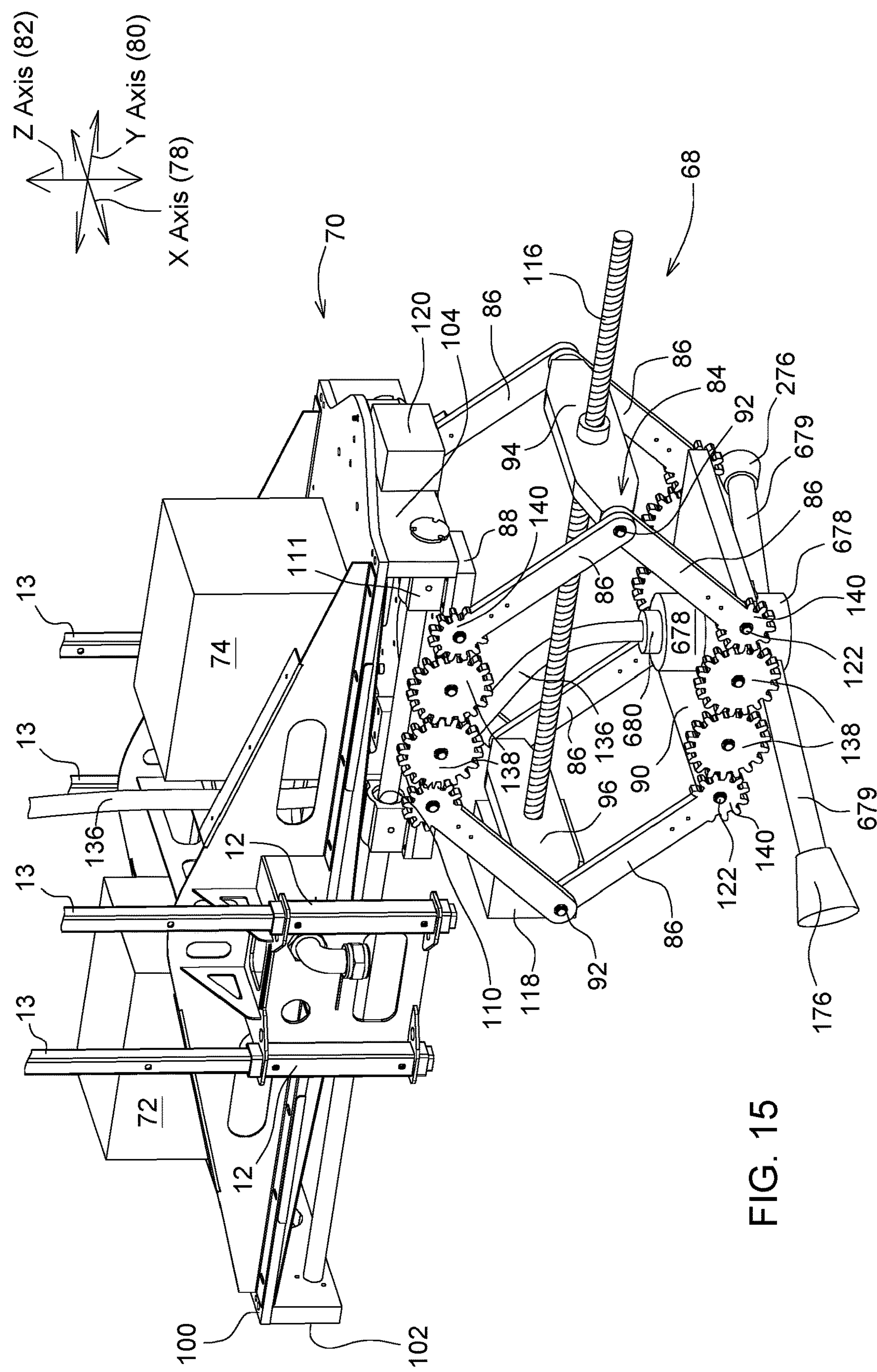
FIG. 15 is a perspective view of an alternate embodiment of a lower carriage of a sprayer row unit as viewed along reference line 15-15 of FIG. 14.

FIG. 15 is a perspective view of an alternate embodiment of a lower carriage 266 of a sprayer row unit as viewed along reference line 15-15 of FIG. 14. The lower carriage 266 of FIG. 14 and FIG. 15 is adapted to provide simultaneous bi-directional spraying of crop inputs onto one or more rows of crop, or associated soil of a field.

Referring to FIG. 14 in conjunction with FIG. 15, the crop inputs, such as pesticide, herbicide, fungicide or fertilizer, in fluid or liquid phase are stored in first tank 36 and a second tank 38. A pump (32, 34) provides crop inputs as pumped fluid via tubing 136 to manifold 678. In one embodiment, the manifold 678 comprises a first electrohydraulic valve 81 for controlling a flow (e.g., on versus off), flow rate, pressure, droplet size, atomization, pattern, or other spraying parameters of fluid emitted from a first nozzle 176 and a second electrohydraulic value for controlling a flow (e.g., on versus off), flow rate, pressure, droplet size, atomization, pattern, or other spraying parameters of fluid emitted from a second nozzle 276.

In an alternate embodiment, the manifold 678 merely provides a passageway or interconnection (e.g., tee or Y connection) to distribute the crop input, liquid or fluid from an input 680 to the first nozzle 176 and the second nozzle 27 via tubes 679, where the first nozzle 176 may comprise a first electrohydraulic valve 81 for controlling a flow (e.g., on versus off), flow rate, pressure, droplet size, atomization, pattern, or other spraying parameters of fluid emitted from a first nozzle 176 and where the second nozzle 276 may comprise and a second electrohydraulic value for controlling a flow (e.g., on versus off), flow rate, pressure, droplet size, atomization, pattern, or other spraying parameters of fluid emitted from a second nozzle 276.

In one embodiment, an electronic data processor 903 or a mission planning module 909 can provide a control signal (e.g., via data port 904 to a wireless communications link, such as the Institute of Electrical and Electronics Engineers (IEEE) 802.11 standard, or via a transmission line) to the first electrohydraulic valve 81 and the second electrohydraulic valve 85 (in the manifold or in the first nozzle 176 and the second nozzle 276) in accordance with a manual setting, a mission plan, a spraying plan, or an agronomic prescription. An electronic data processor 903 or mission planning module 909 can provide a control signal to the a first electrohydraulic valve 81 and the second electrohydraulic valve 85 to control flow of crop input emitted from the first nozzle 176 and the second nozzle 276, respectively, in accordance with a manual setting, a mission plan, a spraying plan, or an agronomic prescription. For example, a mission plan, spraying plan or agronomic prescription may comprise a set of spraying parameters (e.g., rate, concentration, pressure, droplet size) versus position of the lower carriage 266 or sprayer row unit in the field based upon a position provided by a first location-determining receiver 22 and/or a second location determining receiver 24.

In one embodiment, the first nozzle 176 and the second nozzle 276 are associated with an adjustable reference position in one or more dimensions with respect to the beam 10. In one example, the first adjustment controller 72 or another data processor 903 can control the first adjustment actuator 118 on the lower carriage 266 to adjust dynamically or statically the spraying height (e.g., along the Z axis) of the first nozzle 175 and the second nozzle 275 on a row-by-row basis or for a section of row of plants, or even for a single plant. In another example, the second adjustment controller 74 or another data processor 903 can control the second adjustment actuator 120 (e.g., along the X axis) in the longitudinal direction of travel. In still another example, the upper motor controller 17 can control the upper motor 16 to control the lateral position (e.g., along the Y axis) of the first nozzle 175 and the second nozzle 275 on a row-by-row basis or for a section of row of plants, or even for a single plant.

Figure 16:
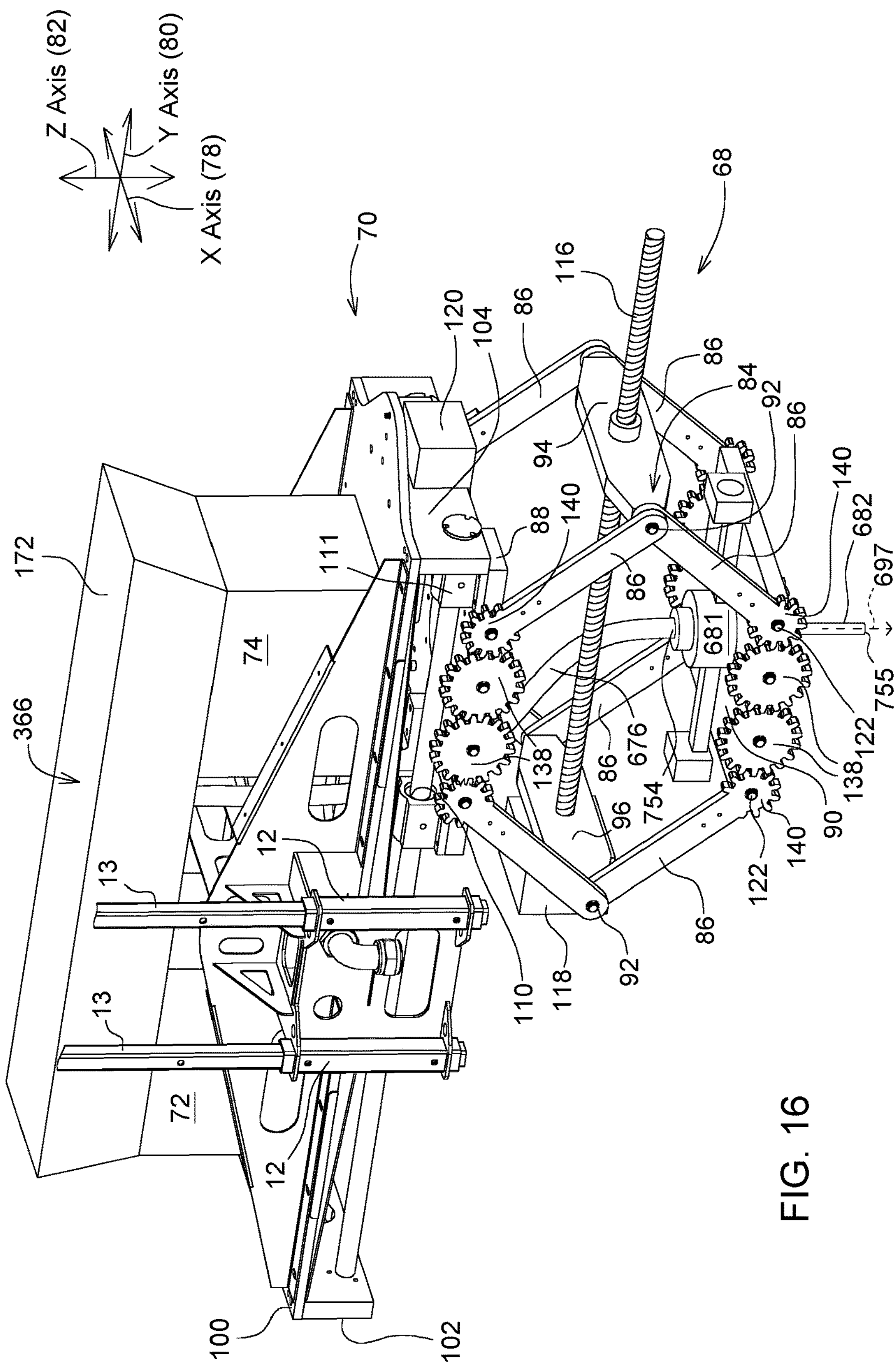
FIG. 16 is a perspective view of an alternate embodiment of a lower carriage of a planter unit that supports dynamic placement of seeds.

FIG. 16 is a perspective view of an alternate embodiment of a lower carriage 366 of a planter unit that supports dynamic and precise placement of seeds. For each row unit, the lower carriage 166 of FIG. 12 may be replaced with the lower carriage 366 of FIG. 16, for example.

In FIG. 16, he seeds are stored in a seed bin 172, which can be located above or on the upper platform 88, or frame 100. As illustrated, the seed bin 172 is located above the first adjustment controller 72, the second adjustment controller 74, or batteries. The seed bin 172 may have a funnel shaped lower portion that feeds tube 676 with seed (e.g., by gravity). The tube 676 terminates in a planting device 681.

In one embodiment, the planting device 681 has an input 754 coupled the seeding tube 676 and an output coupled to a rigid planting tube 682. The planting device 681 may be associated with an electromechanical valve or electro-pneumatic valve that can be open or closed to regulate flow of seed between the input 754 and the output of the planting device 681. In one embodiment, the mission planning module 909 or the electronic data processor 903 generates a control signal to control the planting device 681, or its valve, to regulate the flow of seed that is planted into the soil or ground. For instance, the electronic data processor 903 or mission planning module 909 sends the control signal to the planting device 681 via data port 904 to a wireless communications link, such as the Institute of Electrical and Electronics Engineers (IEEE) 802.11 standard, or via a transmission line. The planting device 681 may use its valve, gravity and/or air pressure to control the dispensation or planting of seeds from the output of the planting device 681 through the planting tube 682 and into or on the ground.

In one embodiment, the planting device 681 has a rigid planting tube 682 with a pointed or sharpened leading edge 755 for penetrating the ground or soil. In another embodiment, the leading edge 755 or tip of the rigid planting tube 681 comprises an annular edge. In an alternate embodiment, the leading edge 755 of the rigid planting tube comprises a sharpened, tapered annular edge or a hollow cylindrical spear-shaped portion.

A central axis 697 of the planting tube 682 or its leading edge 755 may be aligned with a planned seed or plant location for each seed or plant to be planted in a grid or other planting bed pattern. In one embodiment, an electronic data processor 903 or a plant (row) position estimator 912 determines the seed or plant location based on three dimensional position data estimated by one or more location determining receivers (22, 24) on the agricultural vehicle (e.g., planter vehicle) and the three dimensional position of the row unit for any respective planting tube 682. For example, the three dimensional position of any lower carriage 366; hence, the three dimensional position of the axis 697 of the planting tube 682, depends upon the x, y and z coordinate positions of the lower carriage 366 with respect a positional reference frame or global reference frame that is estimated by the one or more location determining receivers (22, 24) on the agricultural vehicle.

As the vehicle moves through the field, actuators (118, 120, 16), controllers (72, 74, 17), and/or position sensors or encoders associated with one or more actuators (118, 120, 16) or one or more controllers (72, 74, 17) can estimate x, y, z coordinate positions of each lower carriage 36 with respect to one or more reference points on the agricultural vehicle, such as a reference point that coincides with a known offset to respective antennae of one or more location determining receivers (22, 24). The plant (row) position estimator 912, the path planning module 910, the mission planning module 909 and/or the data processor 903 can estimate the three dimensional position of each planting tube 682 for a corresponding lower carriage 366 (or row unit) on a time interval by interval basis, as the vehicle traverses through a field. The plant (row) position estimator 912, the mission planning module 909 and/or the data processor 903 can determine a difference or error between the current position of each lower carriage 366, row unit, or planting tube 682 and a target position of such lower carriage 366, row unit, or planting tube 682 from a stored mission plan, seed planting plan, or the like stored in a data storage device 906. The plant (row) position estimator 912, the mission planning module 909, and/or the data processor 903 can send data messages or commands to the actuators (118, 120, 16) or controllers (72, 74, 17) to move the respective planting tube 682 to a target position that minimizes a difference or error between the current position of each lower carriage 366, row unit, or planting tube 682 and a target position of such lower carriage 366, row unit, or planting tube 682 from a stored mission plan, seed planting plan, or the like stored in a data storage device 906.

In one embodiment, the electronic data processor 903 or mission planning module 909 sends the control signal to plant one or more seeds during a time interval to the planting device 681 via data port 904 to a wireless communications link, such as the Institute of Electrical and Electronics Engineers (IEEE) 802.11 standard, or via a transmission line. Accordingly, each lower carriage 366 or planter row unit of the planter vehicle can plant the seed at precise locations in virtually any pattern, such as rows, equidistant seed spacing in one or more dimensions, elliptical, circular or hill seed placement, spiral seed placement, uniform seed density per seed bed area, variable seed density per seed bed area, or other targeted seed spacing. However, the plant (row) position estimator 912, mission planning module 909, or data processor 903 may place constraints or limits on the possible seed patterns to limit the planted seed pattern to rows or sets of rows to match the configuration (e.g., row spacing) of a harvester or combine, if necessary. For example, a harvester or combine for corn may be configured to harvest rows with generally uniform spacing within certain tolerances.

Figure 17:
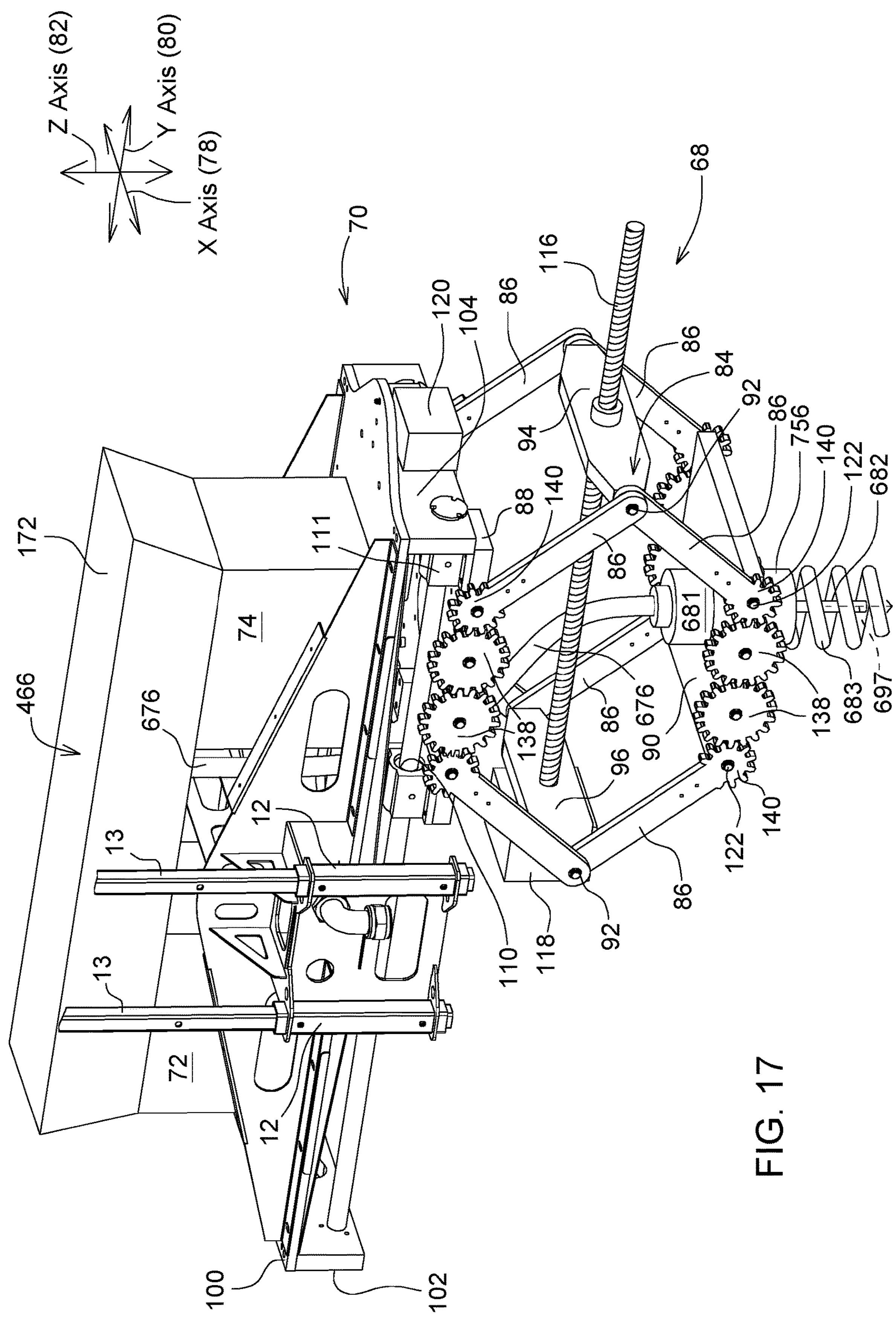
FIG. 17 is a perspective view of an alternate embodiment of a lower carriage of a planter unit that is equipped with dynamic placement of seeds and a rotatable soil tiller.

FIG. 17 is a perspective view of an alternate embodiment of a lower carriage 466 of a planter unit that is equipped with dynamic placement of seeds and a rotatable soil tiller 683. The lower carriage 466 of FIG. 17 is similar to the lower carriage 366 of FIG. 16, except the lower carriage 466 of FIG. 17 further comprises a rotatable soil tiller 683 to loosen, cultivate the soil in preparation for dispensation or planting of seed. As illustrated in FIG. 17, the soil tiller 683 is coaxially mounted with the axis 697 of the planting tube 682. In one embodiment, soil tiller has a cork-screw shape, a spiral shape, or the shape of a coil spring. The soil tiller 683 may be driven or rotated by a rotor of an electric motor 756 via a coupler or torque coupling device. In one configuration, the electric motor 756 has a housing or stator mounted to the lower platform 88.

Having described the preferred embodiment, it will become apparent that various modifications can be made without departing from the scope of the invention as defined in the accompanying claims.

The following is claimed:

1. An agricultural machine, the agricultural machine comprising: a left frame;

a left wheel being rotatable with respect to the left frame; a first leg extending upward from the left frame;

a right frame;

a right wheel being rotatable with respect to the right frame; a second leg extending upward from the right frame;

a beam connecting the first leg to the second leg;

one or more satellite navigation receivers are associated with the beam to determine a reference point position of the beam and an attitude or angular orientation of the beam;

a plurality of independently position-adjustable row units suspended from the beam, each row unit, among the plurality, having a first nozzle and a second nozzle, wherein the first nozzle and the second nozzle are associated with a respective adjustable reference position in two or more dimensions with respect to the beam for nozzle alignment with one or more plant rows comprising a plant row height and a plant row center, the two or more dimensions being associated with the plant row height and a lateral distance from the plant row, the plurality of independently position-adjustable row units being configured to move vertically relative to each other; and a plurality of drive motors for rotating at least one of the right wheel and the left wheel to propel the agricultural machine to align its yaw angle of the reference point position of the beam with respect to substantially linear segments of the one or more plant rows based on the determined position and the attitude and to turn the agricultural machine by the drive motors' rotating the right wheel and left wheel with a differential rate or rotation to track a path plan for spraying the one or more plant rows, where the path plan comprises one or more of the substantially linear segments interconnected by end row turns.

2. The agricultural machine according to claim 1 wherein the one or more satellite navigation receivers comprises a first satellite navigation receiver with two switched antennas that are spatially separated along the beam, such that the one or more satellite navigation receivers can determine a first position of a first antenna and a second position of a second antenna to estimate the reference point position and the attitude.

3. The agricultural machine according to claim 1 wherein the one or more satellite navigation receivers comprises:

a first satellite navigation receiver on a first end of the beam, wherein the first satellite navigation receiver determines a first position;

a second satellite navigation receiver on a second end of the beam opposite the first end, wherein the second satellite receiver determines a second position simultaneously with the determination of the first position;

an electronic data processor configured to estimate the reference point associated with the beam of the machine and an angular orientation or attitude of the beam relative to the reference point.

4. The agricultural machine according to claim 1 wherein the attitude comprises at least one of the roll angle, tilt angle or yaw angle of the beam or the machine.

5. The agricultural machine according to claim 1 wherein the first nozzle and the second nozzle face opposite directions to provide simultaneous bi-directional spraying of crop inputs onto one or more rows of crop, or associated soil of a field.

6. The agricultural machine according to claim 1 further comprising:

a manifold comprising a first electrohydraulic valve for controlling a flow of crop input emitted from the first nozzle, the manifold comprising a second electrohydraulic valve for controlling a flow of crop input emitted from the second nozzle.

7. The agricultural machine according to claim 1 further comprising:

a first electrohydraulic valve associated with, or integral with, the first nozzle;

a second electrohydraulic value associated with, or integral with, the second nozzle;

a mission planning module to provide a control signal to the first electrohydraulic valve and the second electrohydraulic valve to control flow of crop input emitted from the first nozzle and the second nozzle, respectively, in accordance with a manual setting, a mission plan, a spraying plan, or an agronomic prescription.

8. The agricultural machine according to claim 7 wherein the mission plan, spraying plan or agronomic prescription comprises a set of spraying parameters versus position of a lower carriage or each row unit in the field based upon a position provided by a first location-determining receiver and a second location determining receiver.

9. The agricultural machine according to claim 1 wherein each said row unit has the adjustable reference position that is movable in two or more dimensions, including vertical target height of one of the nozzles to the ground.

10. The agricultural machine according to claim 1 further comprising:

a first adjustment actuator;

a first adjustment controller configured to control the first adjustment actuator on a lower carriage of each row unit to adjust dynamically or statically a spraying height of the first nozzle and the second nozzle on a row-by-row basis or for a section of row of plants, or even for a single plant.

11. The agricultural machine according to claim 10 further comprising:

a second adjustment actuator;

a second adjustment controller configured to control the second adjustment actuator to move in a longitudinal direction of travel.

12. The agricultural machine according to claim 1 further comprising:

an upper motor;

an upper motor controller is configured to control the upper motor to control a lateral position of the first nozzle and the second nozzle on a row-by-row basis or for a section of row of plants, or even for a single plant.

13. The agricultural machine according to claim 12 further comprising:

a data processor configured to determine real world coordinates of each said row unit, a lower carriage or the first nozzle and second nozzle based on observed position and attitude of the agricultural machine to establish an estimated real-world lateral position of the nozzles on each row unit, which can be corrected for any material lateral slope of the ground given a height of an antenna of the satellite navigation receiver above ground.

14. The agricultural machine according to claim 12 wherein the upper motor is configured to adjust the first and second nozzles to be located a certain lateral distance between the plant, a plant center, a plant row center, a plant stem, plant trunk, plant stalk, plant row, plant root zone, or other reference point of the plant.

15. The agricultural machine according to claim 10, wherein the spraying height is adjusted to maintain a minimum height clearance of the lower carriage with respect to the ground.

16. The agricultural machine according to claim 10 further comprising:

an imaging device configured to collect image data related to one or more plant rows; and a plant row estimator configured to estimate a three-dimensional representation of the one or more plant rows, wherein the spraying height is adjusted to maintain a relative height to a peak plant height, an average or median foliage height, or a peak leaf canopy height based on the three-dimensional representation of the collected image data.

17. An agricultural machine, the agricultural machine comprising:

a left frame;

a left wheel being rotatable with respect to the left frame;

a first leg extending upward from the left frame;

a right frame;

a right wheel being rotatable with respect to the right frame;

a second leg extending upward from the right frame;

a beam connecting the first leg to the second leg; one or more satellite navigation receivers are associated with the beam to determine a reference point position on the beam and an attitude or angular orientation of the beam;

a plurality of independently adjustable row units suspended from the beam, each row unit among the plurality having a first nozzle and a second nozzle, wherein the first nozzle and the second nozzle are associated with a respective adjustable reference position in two or more dimensions with respect to the beam, the two or more dimensions being associated with the plant row height and a lateral distance from the plant row, the plurality of independently position-adjustable row units being configured to move vertically relative to each other;

a plurality of drive motors for rotating at least one of the right wheel and the left wheel to propel the agricultural machine along a substantially straight linear path based on the determined position and the attitude;

an upper motor;

an upper motor controller is configured to control the upper motor to control a lateral position of the first nozzle and the second nozzle on a row-by-row basis or for a section of row of plants, or even for a single plant; and a data processor configured to determine real world coordinates of each said row unit, a lower carriage or the first nozzle and second nozzle based on observed position and attitude of the agricultural machine to establish an estimated real-world lateral position of the nozzles on each said row unit, which is corrected for any material lateral slope of the ground given a height of an antenna of the satellite navigation receiver above ground.

18. The agricultural machine according to claim 1 further comprising:

a first motor controller configured to provide a first signal to control a rotation of a first drive motor among the plurality of drive motors;

a second motor controller configured to provide a second signal to control a rotation of a second drive motor among the plurality of drive motors;

an electronic data processor is configured to provide command data to the first motor controller and the second motor controller to effectuate a substantially differential rate of rotation between the first drive motor and the second drive motor to maintain a curved path segment of the agricultural machine in accordance with the path plan, such that the beam forms a substantially right angular orientation with respect to an intercept of the beam with the curved path segment.

19. The agricultural machine according to claim 1 further comprising:

a first motor controller configured to provide a first signal to control a rotation of a first drive motor among the plurality of drive motors;

a second motor controller configured to provide a second signal to control a rotation of a second drive motor among the plurality of drive motors;

an electronic data processor is configured to provide command data to the first motor controller and the second motor controller to effectuate a substantially identical rate of rotation between the first drive motor and the second drive motor to maintain a straight path segment of the agricultural machine in accordance with a path plan, such that the beam forms a substantially right angular orientation with respect to an intercept of the beam with the straight path segment.

* * * * *